US011673052B2

(12) United States Patent
Uehara

(10) Patent No.: US 11,673,052 B2
(45) Date of Patent: Jun. 13, 2023

(54) NON-PLAYER CHARACTER ACTION CONTROL USING GAME SERVER

(71) Applicant: CYGAMES, INC., Tokyo (JP)

(72) Inventor: Mitsuaki Uehara, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/150,464

(22) Filed: Jan. 15, 2021

(65) Prior Publication Data

US 2021/0138345 A1    May 13, 2021

Related U.S. Application Data

(63) Continuation of application No. PCT/JP2019/028017, filed on Jul. 17, 2019.

(30) Foreign Application Priority Data

Jul. 19, 2018 (JP) .............................. JP2018-135588

(51) Int. Cl.
*A63F 13/537* (2014.01)
*A63F 13/58* (2014.01)
*A63F 13/35* (2014.01)

(52) U.S. Cl.
CPC .............. *A63F 13/58* (2014.09); *A63F 13/35* (2014.09); *A63F 13/537* (2014.09)

(58) Field of Classification Search
None
See application file for complete search history.

(56) References Cited

U.S. PATENT DOCUMENTS 9,789,404 B2    10/2017  Taoka et al.
10,727,173 B2    7/2020  Park et al.
(Continued)

FOREIGN PATENT DOCUMENTS

JP    2002292139 A    10/2002
JP    2007098063 A    4/2007
(Continued)

OTHER PUBLICATIONS

Yamazaki et al. "P2P Multi-player Online Role Playing Game; Proposal and Evaluation of Distributed Management Method for Preventing Malicious Use of Game Information in P2P Massively Multi-player Online Role Playing Game" IEICE Technical Report, vol. 111, No. 469; Mar. 1, 2012 (8 pages).
(Continued)

*Primary Examiner* — Damon J Pierce
(74) *Attorney, Agent, or Firm* — Osha Bergman Watanabe & Burton LLP

(57) ABSTRACT

The present invention provides a game system including a server and a client terminal. The server includes: a means for controlling an action of a non-player object and sending first NPC action information indicating the content of the action of the non-player object to the client terminal; a means for managing a first parameter value in association with the non-player object and each of a plurality of player objects; a means for setting a target object on the basis of the first parameter value, the target object being a target on which the non-player object performs a predetermined action; and a means for issuing a notification for permitting action control for the non-player object to the client terminal that controls the action of the player object set as the target object. The client terminal includes a means for controlling an action of the non-player object based on the notification.

16 Claims, 15 Drawing Sheets

(56) References Cited

U.S. PATENT DOCUMENTS

| | | |
|---|---|---|
| 2002/0142834 A1 | 10/2002 | Sobue |
| 2007/0054716 A1 | 3/2007 | Hiruta |
| 2009/0137320 A1* | 5/2009 | Kimura ................ A63F 13/352 |
| | | 463/42 |
| 2011/0230258 A1 | 9/2011 | Van Luchene |
| 2012/0190444 A1* | 7/2012 | Fujisawa ................ A63F 13/55 |
| | | 463/31 |
| 2015/0119140 A1* | 4/2015 | Ikeda ................ A63F 13/5258 |
| | | 463/31 |
| 2015/0238864 A1 | 8/2015 | Taoka et al. |
| 2016/0279522 A1* | 9/2016 | de Plater ................ A63F 13/67 |
| 2018/0071624 A1 | 3/2018 | Fukuda |

FOREIGN PATENT DOCUMENTS

| | | |
|---|---|---|
| JP | 2014068657 A | 4/2014 |
| JP | 2018042648 A | 3/2018 |

OTHER PUBLICATIONS

International Search Report issued in International Application No. PCT/JP2019/028017, dated Oct. 15, 2019 (5 pages).
Written Opinion issued in International Application No. PCT/JP2019/028017; dated Oct. 15, 2019 (5 pages).

* cited by examiner

FIG. 5

| PC ID | H.P. | LEVEL | CURRENCY | POSITION | ---- |
|---|---|---|---|---|---|
| PC000001 | 72 | 3 | 620 | (···, ···) | ---- |
| ⋮ | ⋮ | ⋮ | | ⋮ | ⋮ |

FIG. 6

| NPC ID | H.P. | LEVEL | POSITION | HATRED VALUES | | TARGET OBJECT | ... |
|---|---|---|---|---|---|---|---|
| | | | | PC000001 | PC000002 | | |
| NPC000001 | 112 | 4 | (..., ...) | 0.8 | 0.6 | PC000001 | ... |
| NPC000002 | 79 | 2 | (..., ...) | 0.3 | 0 | — | ... |
| ... | ... | ... | ... | ... | ... | ... | ... |

NON-PLAYER CHARACTER ACTION CONTROL USING GAME SERVER

TECHNICAL FIELD

The present invention relates to game systems, control methods for game systems, servers, and programs.

BACKGROUND ART

Patent Literature 1 discloses a client-server network game system. Specifically, Patent Literature 1 discloses a game-screen switching method in which, in the case where an ally character and an enemy character come into contact with each other, characters present within a predetermined range of the position of that contact are displayed together on a player terminal on which a related character is being operated.

CITATION LIST

Patent Literature

{PTL 1}
Japanese Unexamined Patent Application, Publication No. 2002-292139

SUMMARY OF INVENTION

Technical Problem

MMORPGs (Massively Multiplayer Online Role-Playing Games) are known client-server online games. With an MMORPG, a large-scale game that continues to proceed as long as a server is running and in which a large number of players can participate is realized. However, the inventors discovered the following problem with MMORPGs.

In an MMORPG, a player character for which action control is performed on the basis of player (user) inputs and non-player characters for which action control is performed by a computer appear. The action control refers to the determination of action content (e.g., attacking or moving), etc.

Action control for a non-player character is performed by a server. The server sends information indicating the content of an action of the non-player character to client terminals. The client terminals change how the non-player character is displayed on the local terminals on the basis of the information received from the server.

Furthermore, each client terminal performs action control for each player character on the basis of player inputs. Furthermore, each client terminal sends information indicating the content of an action of the player character to the server, and changes how the player character is displayed on the local terminal on the basis of the action control performed on the local terminal.

As described earlier, in ordinary MMORPGs, the agents that perform action control individually for a non-player character and a player character differ. Thus, there is a problem in that the real-time properties in displaying a response of the non-player character are compromised in a scene in which the player character performs a certain action on the non-player character and the non-player character responds to that action, such as a battle scene.

For example, in the case where a client terminal has accepted a player input with which the player character attacks the non-player character, the client terminal displays a screen indicating the attack, while sending information indicating the content of the action of the player character (attack) to the server. Upon receiving this information, the server determines the content of an action of the non-player character in response to that action and sends the action content to the client terminal. Then, on the basis of the information received from the server, the client terminal displays a screen indicating the action of the non-player character. That is, a screen indicating a response of the non-player character to the attack by the player character is displayed.

In this case, due to the abovementioned communication between the client terminal and the server, etc., a time lag occurs between the time when the attack on the non-player character by the player character is displayed on the client terminal and the time when the response of the non-player character to the attack is displayed on the client terminal, which compromises the real-time properties in displaying the response of the non-player character. Patent Literature 1 does not disclose any means for solving this problem.

The present invention addresses the problem of alleviating the above-described problem with real-time properties, which may occur in MMORPGs.

Solution to Problem

The present invention provides
a game system comprising a server and a client terminal,
wherein the server includes:
a first NPC action control unit that controls an action of a non-player object and sends first NPC action information indicating the content of the action of the non-player object to the client terminal;
a management unit that manages a first parameter value in association with the non-player object and each of a plurality of player objects;
a target-object setting unit that sets a target object on the basis of the first parameter value, the target object being a target on which the non-player object performs a predetermined action; and
a notification unit that issues a notification for permitting action control for the non-player object to the client terminal that controls an action of the player object set as the target object, and
wherein the client terminal includes:
a second NPC action control unit that controls an action of the non-player object on the basis of the notification.
Furthermore, the present invention provides
a control method for a game system including a server and a client terminal,
wherein the server executes:
a first NPC action control step of controlling an action of a non-player object and sending first NPC action information indicating the content of the action of the non-player object to the client terminal;
a parameter-value management step of managing a first parameter value in association with the non-player object and each of a plurality of player objects;
a target-object setting step of setting a target object on the basis of the first parameter value, the target object being a target on which the non-player object performs a predetermined action; and
a notification step of issuing a notification for permitting action control for the non-player object to the client terminal that controls an action of the player object set as the target object, and wherein the client terminal executes:
a second NPC action control step of controlling an action of the non-player object on the basis of the notification.

Furthermore, the present invention provides
a server in a game system including the server and a client terminal,
the server comprising:
a first NPC action control unit that controls an action of a non-player object and sends first NPC action information indicating the content of the action of the non-player object to the client terminal;
a management unit that manages a first parameter value in association with the non-player object and each of a plurality of player objects;
a target-object setting unit that sets a target object on the basis of the first parameter value, the target object being a target on which the non-player object performs a predetermined action; and
a notification unit that issues a notification for permitting action control for the non-player object to the client terminal that controls an action of the player object set as the target object.

Furthermore, the present invention provides
a program for causing a server in a game system including the server and a client terminal to function as:
a first NPC action control means for controlling an action of a non-player object and sending first NPC action information indicating the content of the action of the non-player object to the client terminal;
a parameter-value management means for managing a first parameter value in association with the non-player object and each of a plurality of player objects;
a target-object setting means for setting a target object on the basis of the first parameter value, the target object being a target on which the non-player object performs a predetermined action; and
a notification means for issuing a notification for permitting action control for the non-player object to the client terminal that controls an action of the player object set as the target object.

Advantageous Effects of Invention

According to the present invention, it is possible to alleviate the above-described problem with the real-time properties, which may occur in MMORPGs.

BRIEF DESCRIPTION OF DRAWINGS

The above-described object, other objects, features, and advantages will be further clarified by preferred embodiments described below and the following figures accompanying the preferred embodiments.

FIG. 5 schematically shows an example of information managed by the server 10 in this embodiment.

FIG. 6 schematically shows an example of information managed by the server 10 in this embodiment.

DESCRIPTION OF EMBODIMENTS

First Embodiment

"Overview of Game System 1"

Figure 1:
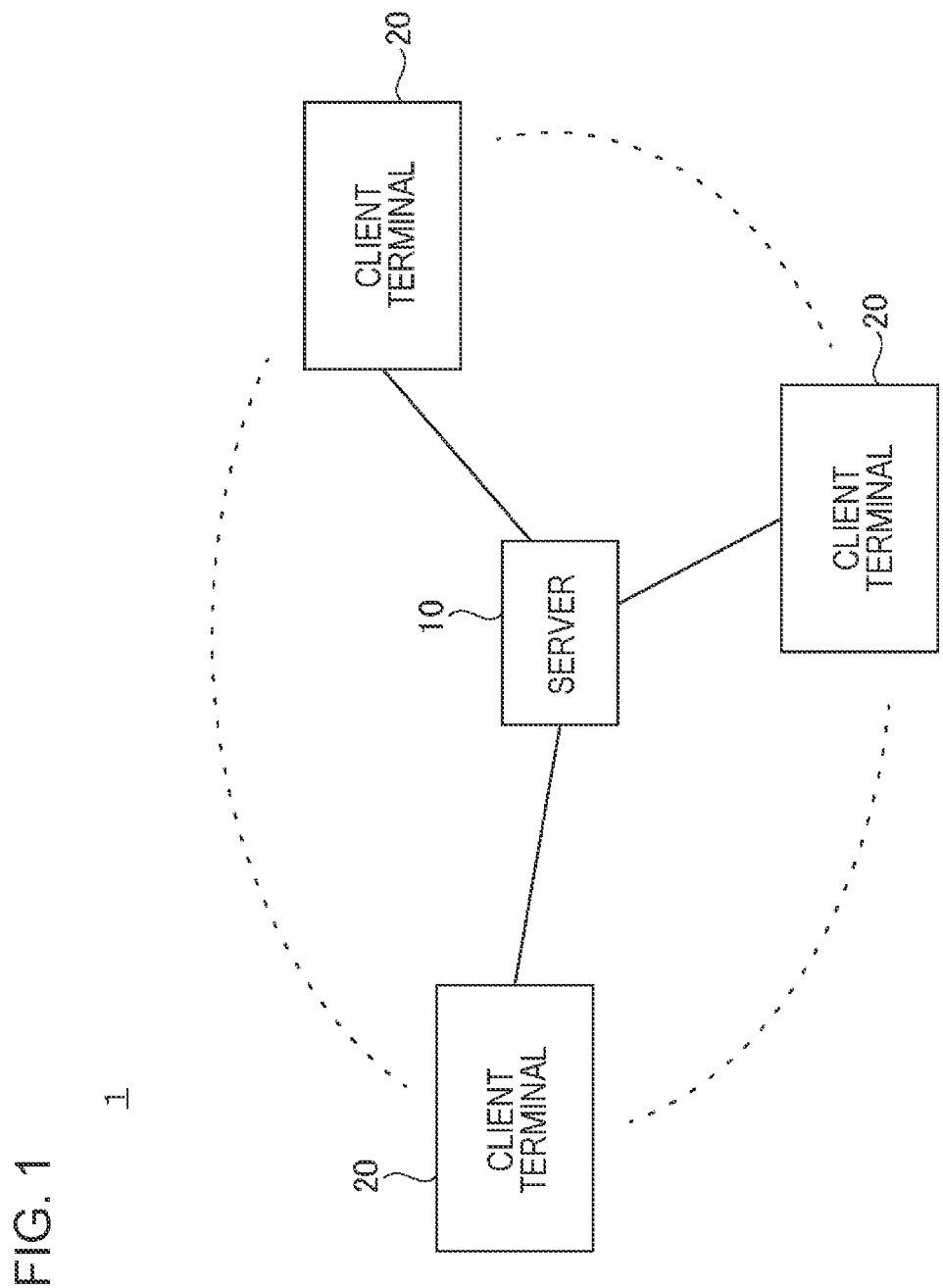
FIG. 1 is a diagram for explaining an overview of a game system 1 according to this embodiment.

First, an overview of a game system 1 according to this embodiment will be described by using a functional block diagram in FIG. 1. As shown in the figure, the game system 1 includes a server 10 and a plurality of client terminals 20. Note that the server 10 may be constituted of a plurality of physically and/or logically separated servers or a physically and logically single server. Examples of the client terminals 20 include personal computers, smartphones, tablets, mobile phones, and game machines, without limitation thereto. The server 10 and the client terminals 20 are allowed to communicate with each other via a communication network such as the Internet.

Figure 2:
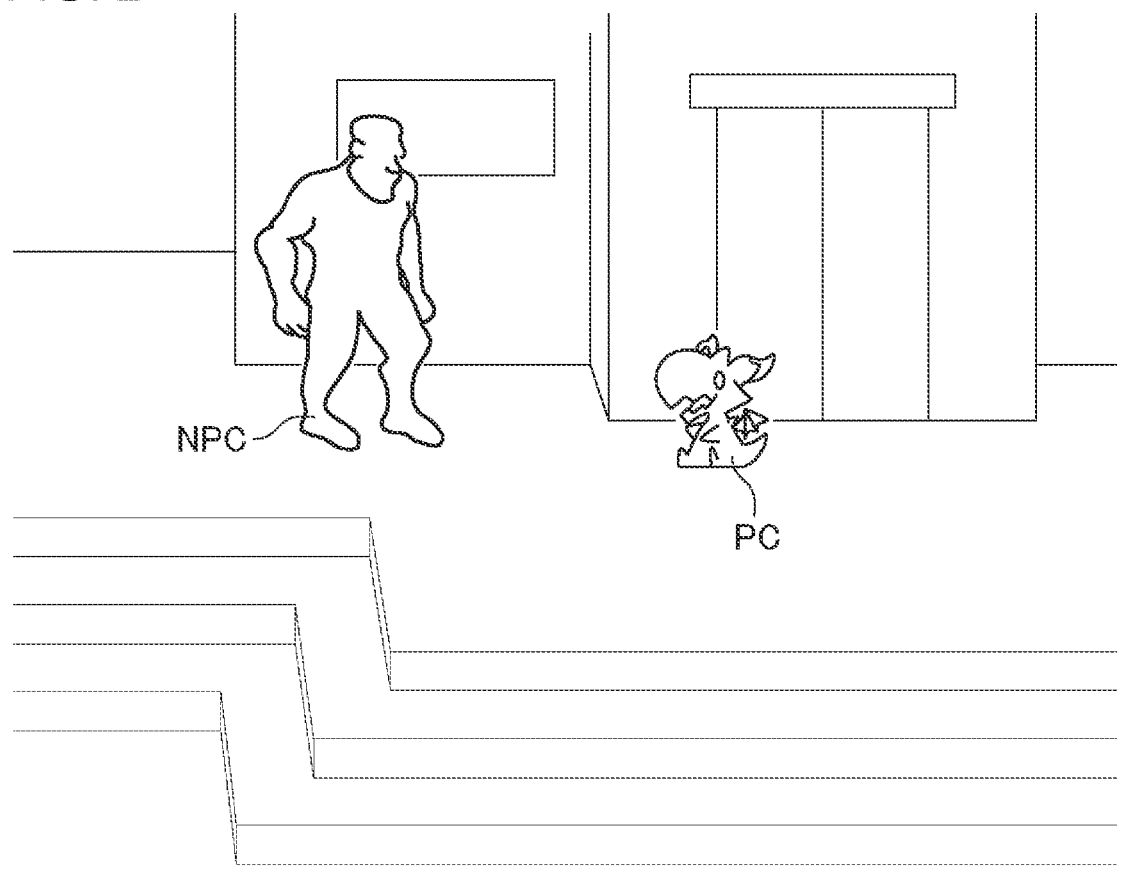
FIG. 2 is an illustration showing an example of a virtual world realized by the game system 1 according to this embodiment.

The game system 1 realizes a client-server online game, specifically, an MMORPG. The server 10 executes a predetermined program, whereby a virtual world of the game is realized. FIG. 2 shows an example of the virtual world realized by the game system 1.

In this virtual world, a player character (player object) for which action control is performed on the basis of inputs by a player and non-player characters (non-player objects) for which action control is performed by a computer appear. In the figures, PC is the player character, and NPC is a non-player character. Furthermore, although not shown, characters that are colleagues of the player character and for which action control is performed by a computer of a client terminal 20 or the server 10 may appear.

A player logs into the server 10 via his or her own client terminal 20 and performs predetermined inputs to the client terminal 20 to control the actions of his or her own player character. For example, the player causes his or her own player character to move in the virtual world or to battle against another character.

"Overview of Features for Alleviating Aforementioned Problem with Real-Time Properties"

Next, the features provided in the game system 1 in order to alleviate the aforementioned problem with the real-time properties will be briefly described. In the game system 1, the actions of non-player characters are controlled by both a computer on the server 10 side and a computer on the client terminal 20 side. The game system 1 differs in this respect from ordinary MMORPGs, in which only a computer on the server 10 side performs action control for non-player characters. The specific content of action control includes the choice as to whether to move or to attack, the determination of a moving destination, and the selection of an attacking skill.

A non-player character has a state in which a target (another character) on which a predetermined action (e.g., an attack) is to be taken is set and a state in which such a target is not set. When a predetermined condition is satisfied in the state where a target on which a predetermined action is to be taken is set, the non-player character performs that predetermined action on that target. Meanwhile, in the state where a target on which a predetermined action is to be taken is not set, the non-player character does not perform a predetermined action on the player character. In this case, the non-player character can perform an action for setting a target on which a predetermined action is to be taken, such as moving or searching.

In the state where a target on which a predetermined action is to be taken is not set or in the case where another non-player character is set as a target on which a predetermined action is to be taken, the computer on the server 10 side performs action control for the non-player character.

Meanwhile, in the case where the player character is set as a target on which a predetermined action is to be taken, the client terminal 20 that performs action control for the player character performs action control for the non-player character.

As a result, in the case where the player character is set as a target on which a predetermined action is to be taken, a single client terminal 20 performs action control for both the player character and a non-player character for which the player character is set as a target of a predetermined action.

For example, in the case where a player character shown in FIG. 2 is set as a target on which a predetermined action is to be taken by a non-player character shown in FIG. 2, the client terminal 20 that performs action control for the player character shown in FIG. 2 performs action control for the non-player character shown in FIG. 2.

In this case, when the client terminal 20 has accepted an input with which the player character attacks the non-player character, the client terminal 20 displays a screen showing the attack, while determining the content of an action to be taken by the attacked non-player character. Then, on the basis of the determined content, the client terminal 20 displays a screen showing the action of the non-player character. That is, a screen showing a response by the non-player character to the attack by the player character is displayed.

As described above, in the case where a single client terminal 20 performs action control for both a player character and a non-player character for which the player character is set as a target of a predetermined action, it becomes possible to determine the content of an action of the non-player character without having to carry out communication between the server 10 and the client terminal 20. Thus, the real-time properties of the display of a response by the non-player character to an action of the player character are improved.

"Configuration of Server 10"

The configuration of the server 10 will be described in detail below. First, an example of the hardware configuration of the server 10 will be described. Each of the functional units provided in the server 10 in this embodiment is realized by an arbitrary combination of hardware and software, which mainly involves a CPU (Central Processing Unit) of an arbitrary computer, a memory, programs loaded into the memory, a storage unit such as a hard disk that stores the programs (which may store programs already stored before the shipping of the device as well as programs stored on a storage medium such as a CD (Compact Disc) or downloaded from a server on the Internet or the like), and a network connection interface. Furthermore, it will be understood by a person skilled in the art that there are various modifications concerning the methods and devices for realizing the functional units.

Figure 3:
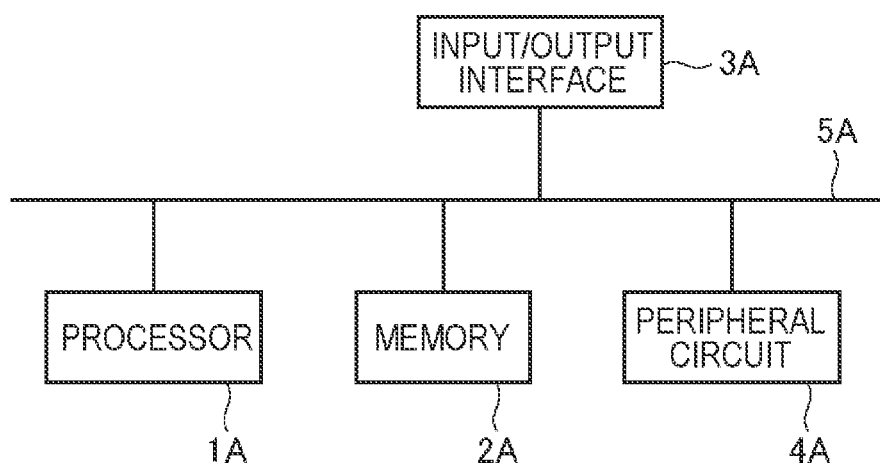
FIG. 3 is a diagram showing an example of the hardware configurations of a server 10 and a client terminal 20 in this embodiment.

FIG. 3 is a block diagram showing an example of the hardware configuration of the server 10 in this embodiment. As shown in FIG. 3, the server 10 includes a processor 1A, a memory 2A, an input/output interface 3A, a peripheral circuit 4A, and a bus 5A. The peripheral circuit 4A includes various modules. The server 10 need not include the peripheral circuit 4A. Note that the server 10 may be constituted of a plurality of physically and/or logically separated devices. In this case, each of the devices may be provided with the hardware configuration described above.

The bus 5A is a data transmission path that allows the processor 1A, the memory 2A, the peripheral circuit 4A, and the input/output interface 3A to send data to and receive data from each other. The processor 1A is a computational processing device, such as a CPU or a GPU (Graphics Processing Unit). The memory 2A is a memory such as a RAM (Random Access Memory) or a ROM (Read Only Memory). The input/output interface 3A includes interfaces for obtaining information from an input device, an external device, an external server, an external sensor, etc., as well as interfaces for outputting information to an output device, an external device, an external server, etc. The input device is, for example, a keyboard, a mouse, or a microphone. The output device is, for example, a display, a speaker, a printer, or a mailer. The processor 1A is capable of issuing instructions to the individual modules and performing computations on the basis of the results of computations by the modules.

Figure 4:
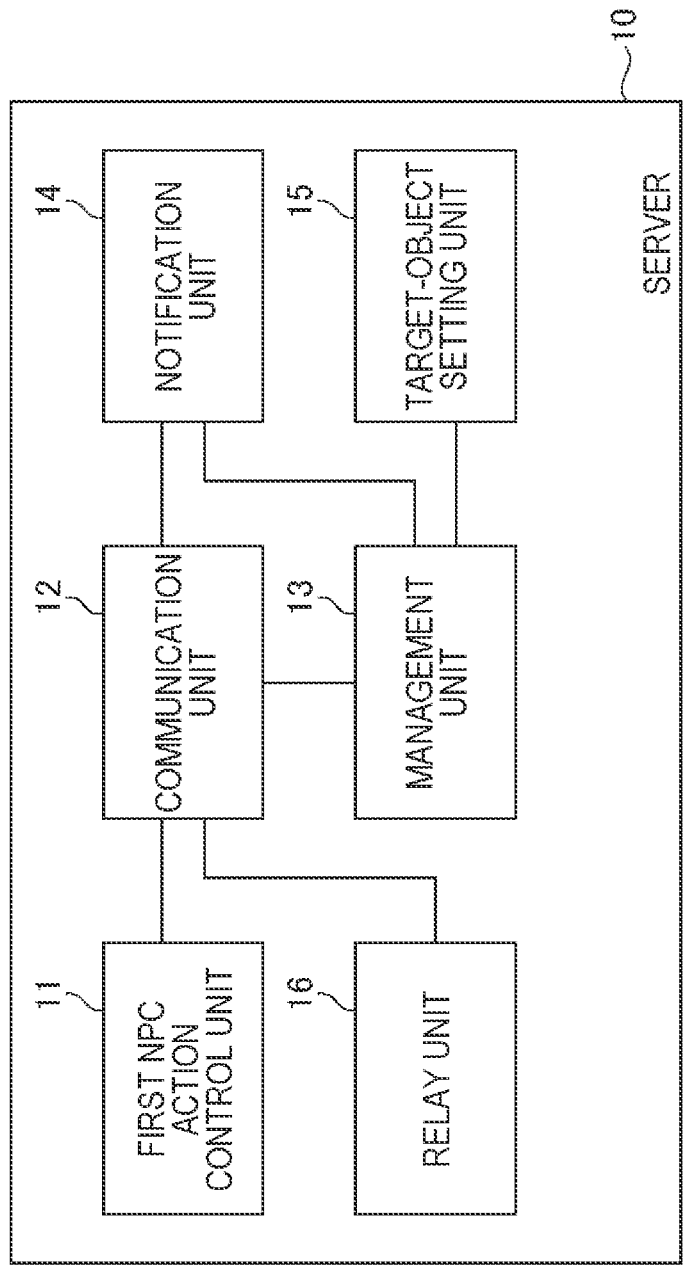
FIG. 4 is a diagram showing an example of functional blocks of the server 10 in this embodiment.

Next, the functional configuration of the server 10 will be described. FIG. 4 shows an example functional block diagram of the server 10. As shown in the figure, the server 10 includes a first NPC action control unit 11, a communication unit 12, a management unit 13, a notification unit 14, a target-object setting unit 15, and a relay unit 16.

The communication unit 12 communicates with each of the plurality of client terminals 20 via a network such as the Internet.

For example, the communication unit 12 sends, to a client terminal 20, information indicating the content of an action of a non-player character for which action control has been performed by the server 10 (first NPC action information).

Furthermore, for example, the communication unit 12 receives, from each client terminal 20, information indicating the content of an action of a player character for which action control has been performed by that client terminal 20 on the basis of player inputs (PC action information).

Furthermore, for example, the communication unit 12 sends the PC action information received from each client terminal 20 to the other client terminals 20.

Furthermore, the communication unit 12 receives, from each client terminal 20, information indicating the content of an action of a non-player character for which action control has been performed by that client terminal 20 (second NPC action information).

Furthermore, for example, the communication unit 12 sends the second NPC action information received from each client terminal 20 to the other client terminals 20.

Note that the communication unit 12 can send other information to each client terminal 20 and receive other information from each client terminal 20.

The management unit 13 manages various kinds of information relating to a game. "Management" refers to storage and updating.

For example, the management unit 13 manages parameter values of each player character. FIG. 5 shows an example of the parameter values of each player character, managed by the management unit 13. In the example shown, for each player character, the ID (PCID), the current hit points (H.P.), the current level, the amount of currency currently possessed, and the current position in the virtual world of the game are recorded in association with each other. The management unit 13 can update the parameter values of each player character on the basis of the content of an action of the player character as indicated by the PC action information, the content of an action of a non-player character as indicated by the first NPC action information, the content of an action of a non-player character as indicated by the second NPC action information, etc.

In addition, the management unit 13 manages parameter values of each non-player character. FIG. 6 shows an example of the parameter values of each non-player character, managed by the management unit 13. In the example shown, for each non-player character, the ID (NPCID), the current hit points (H.P.), the current level, the current position in the virtual world of the game, the hatred value (first parameter value), and the target object currently set as a target on which a predetermined action is to be taken are recorded in association with each other. The management unit 13 can update the parameter values of each non-player character on the basis of the content of an action of the player character as indicated by the PC action information, the content of an action of a non-player character as indicated by the first NPC action information, the content of an action of a non-player character as indicated by the second NPC action information, etc.

Now, the hatred value will be described. A "hatred value" is a value indicating the current state (the level of hostility) of a non-player character in relation to another character. "Another character" refers to a player character, a character associated with a player character, etc. A character associated with a player character is a character that is a colleague of that player character and for which action control is performed by the computer on the server 10 side or the computer on the client terminal 20 side.

Generally, a player having the role referred to as a "tank" takes such actions that positively enhance hatred so as to attract attacks to itself so that enemies (non-player characters) will not attack ally characters, thereby protecting the allies. It is often the case with a "tank" character that the hit points, the defensive ability, the avoidance capability, etc. are set to be high. Players having the role of an "attacker", a "healer", etc. attack enemies or make allies recover, while taking actions so as not to enhance the hatred value so that the chance of being attacked by enemies will be minimized. As compared with a "tank" character, it is often the case with characters such as an "attacker" and a "healer" that the hit points, the defensive ability, the avoidance ability, etc. are set to be low.

As shown in FIG. 6, the management unit 13 manages a hatred value in association with a non-player character and each of a plurality of player characters. Furthermore, the management unit 13 can manage a hatred value in association with a non-player character and each of a plurality of other non-player characters.

The management unit 13 can update the hatred value on the basis of the content of an action of another character, etc. For example, when another character has taken a predetermined action (e.g., an attack) on a non-player character, the management unit 13 can update the hatred value indicating the state of the non-player character in relation to the other character.

It may be allowed to set special effects concerning increases or decreases in the hatred value for various actions that are taken by characters. For example, settings may be made in advance such that a first action increases the hatred value by Q1, a second action increases the hatred value by Q2, a third action decreases the hatred value by Q3, and so forth.

Furthermore, the amount of increase or decrease in the hatred value may be determined on the basis of the result of an action that has been executed. For example, in the case where a character has attacked a non-player character, the amount of increase in the hatred value may be determined on the basis of the amount of damage given by the attack. In this case, the amount of increase in the hatred value becomes greater as the damage given becomes greater.

Furthermore, actions that increase the hatred value may include an action of assisting a character participating in a battle with a non-player character in addition to an attack on a non-player character. Although the specific content of assistance varies depending on the game, examples thereof include the recovery of the hit points, the use of an item, and the invocation of a skill.

Furthermore, the hatred value may be gradually decreased as time elapses. In this case, if a character does not perform an attack or the like on a non-player character over a long period, the hatred value of the non-player character in relation to that character is gradually decreased.

Next, target objects managed by the management unit 13 will be described. A "target object" is a character that is set as a target on which a predetermined action (e.g., an attack) is to be taken by a non-player character. A player character or another non-player character is set as a target object.

In the example in FIG. 6, for a non-player character with "NPCID:NPC00001", a player character with "PCID: PC000001" is set as a target object. For a non-player character with "NPCID:NPC00002", a target object is not set. As such, a non-player character has a state in which a target object is set and a state in which a target object is not set.

Information indicating whether or not such a target object is set serves as state information indicating whether or not a client terminal 20 is in a state permitted to control the actions of a non-player character. In the case where a target object is set, the client terminal 20 is in a state permitted to control the actions of the non-player character in that state. Meanwhile, in the case where a target object is not set, the client terminal 20 is not permitted to control the actions of the non-player character in that state. In the case of the example in FIG. 6, the client terminal 20 is permitted to control the actions of the non-player character with "NPCID: NPC00001". Meanwhile, the client terminal 20 is not permitted to control the actions of the non-player character with "NPCID:NPC00002".

The management unit 13 updates the values in the fields of the target objects for the individual non-player characters on the basis of the settings in the target-object setting unit 15 shown in FIG. 4.

The target-object setting unit 15 sets a target object for each non-player character on the basis of the hatred value of that non-player character. "The hatred value of each non-player character" refers to a hatred value indicating the current state of that non-player character in relation to another character. The hatred value of each non-player character may include hatred values individually in relation to a plurality of other characters, i.e., a plurality of hatred values.

The target-object setting unit 15 sets, as the target object for each non-player character, another character satisfying a setting condition defined on the basis of the hatred value. Although examples of the setting condition will be described below, the setting condition is not limited to these examples.

As an example, the target-object setting unit 15 may set, as the target object for a first non-player character, another character with which the hatred value of the first non-player character is the greatest. For example, suppose that the hatred values of the first non-player character are as follows:

First other character: 0.6
Second other character: 0.8
Third other character: 0.4
Fourth other character: 0.9

In this case, the target-object setting unit 15 can set, as the target object for the first non-player character, a fourth other character, with which the hatred value of the first non-player character is the greatest.

As another example, the target-object setting unit 15 may set, as the target object for each non-player character, another character satisfying a setting condition defined on the basis of a relative positional relationship with respect to that position of that non-player character and the hatred values of that non-player character.

Specifically, the target-object setting unit 15 may set, as the target object for the first non-player character, another character whose distance from the first non-player character is within a reference value L and with which the hatred value of the first non-player character is the greatest among other characters satisfying the positional condition.

Figure 7:
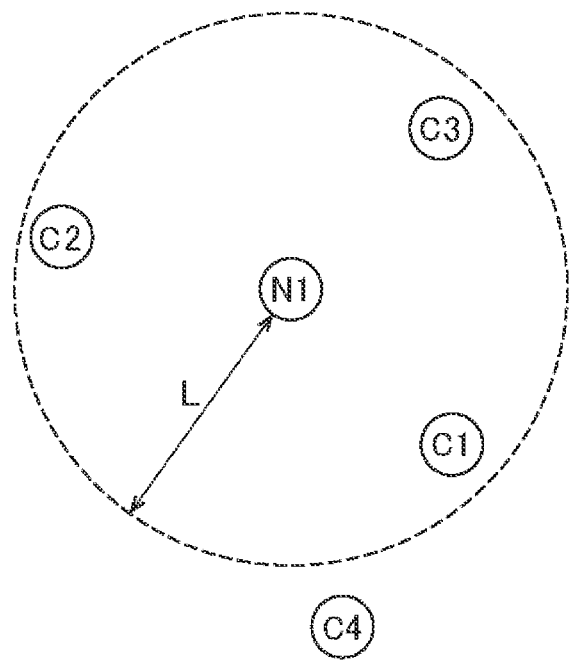
FIG. 7 is an illustration for explaining processing in which the server 10 in this embodiment sets a target object.

For example, suppose that the first non-player character and other characters have positional relationships shown in FIG. 7 and that the hatred values of the first non-player character are as follows. In FIG. 7, N1 is the first non-player character, and C1 to C4 are first to fourth other characters, respectively.

First other character: 0.6
Second other character: 0.8
Third other character: 0.4
Fourth other character: 0.9

In this case, the target-object setting unit 15 can set, as the target object for the first non-player character, the second other character, with which the hatred value of the first non-player character is the greatest among the first to third other characters, whose distances from the first non-player character are within the reference value L.

With this example, it suffices to compare the magnitudes of the hatred values only for the characters satisfying the positional condition, and thus there is no need to compare the magnitudes of the hatred values for all the characters in the game. This alleviates the processing load on the computer.

Alternatively, the target-object setting unit 15 may set, as the target object for the first non-player character, another character whose distance from the first non-player character is within the reference value L, with which there is no predetermined obstacle between the first non-player character and itself, and with which the hatred value of the first non-player character is the greatest among the other characters satisfying the positional condition.

Figure 8:
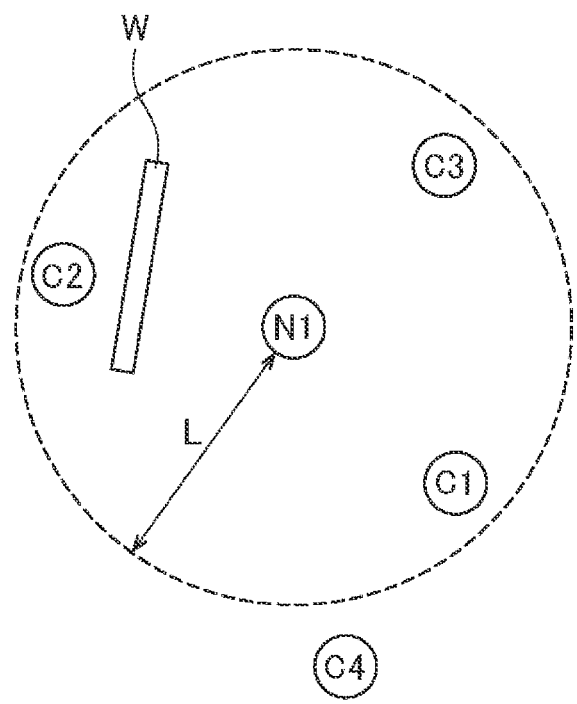
FIG. 8 is an illustration for explaining processing in which the server 10 in this embodiment sets a target object.

For example, suppose that the first non-player character and other characters have positional relationships shown in FIG. 8 and that the hatred values of the first non-player character are as follows. In FIG. 8, N1 is the first non-player character, C1 to C4 are first to fourth other characters, respectively, and W is a wall (predetermined obstacle).

First other character: 0.6
Second other character: 0.8
Third other character: 0.4
Fourth other character: 0.9

In this case, the target-object setting unit 15 can set, as the target object for the first non-player character, the first other character, whose distance from the first non-player character is within the reference value L, and with which the hatred value of the first non-player character is the greatest among the first to third other characters, with which there is no predetermined obstacle between the first non-player character and themselves.

The determination as to whether or not there is any predetermined obstacle between the first non-player character and another character can be realized, for example, by determining whether or not there is any predetermined obstacle on the straight line interconnecting the first non-player character and the other character.

With this example, it suffices to compare the magnitudes of the hatred values only for the characters satisfying the positional condition, and thus there is no need to compare the magnitudes of the hatred values for all the characters in the game. This alleviates the processing load on the computer. Furthermore, the example has a game property in which a player character can avoid being a target of an attack by a non-player character by hiding behind an obstacle, which enhances the fun of the game.

Referring back to FIG. 4, the first NPC action control unit 11 performs action control for a non-player character and sends first NPC action information indicating the content of an action of the non-player character to a client terminal 20. The content of action control includes the selection as to whether to move or attack, the determination of a movement destination, and the selection of an attacking skill. The action content indicated by the first NPC action information includes the kind of action (movement, attack, etc.), the movement direction, the movement distance, and the selected attacking skill.

The first NPC action control unit 11 controls, on the basis of the information managed by the management unit 13 (the aforementioned state information), ascertains whether or not the client terminal 20 is in a state where the client terminal 20 is permitted to control the actions of each non-player character, and executes processing in accordance with that state.

In the case where a target object is not set, i.e., in the case where the client terminal 20 is not permitted to control the actions of a non-player character, the first NPC action control unit 11 performs action control for that non-player character.

Meanwhile, in the case where a target object is set, i.e., in the case where the client terminal 20 is permitted to control the actions of a non-player character, as a rule, the first NPC action control unit 11 does not control the actions of that non-player character. In this case, as a rule, one of the client terminals 20 performs action control for the non-player character.

Note that, even in the case where the client terminal 20 is permitted to control the actions of a non-player character, the first NPC action control unit 11 may control the actions of that non-player character in the case where a predetermined condition is satisfied. In this case, both the server 10 and the client terminal 20 control the actions of the single non-player character. By dictating in advance that priority is given to the action control by the server 10 in such a case, it is possible to proceed with the game without causing a problem.

The notification unit 14 issues a notification for permitting action control for a non-player character to the client terminal 20 that performs action control for a player character set as the target object for that non-player character. An example of this notification will be described below.

For example, each time a target object for a non-player character has been newly set, the notification unit 14 may issue a notification to that effect to a plurality of client terminals 20 (e.g., all the client terminals 20). The content of this notification includes information identifying the non-player character as well as information identifying a character set as the target object for the non-player character.

Each client terminal 20 can recognize whether or not the player character for which action control is performed by itself has been set as a target object by determining whether or not the target object indicated by the notification matches the player character for which action control is performed by itself. Then, upon recognizing that the player character for which action control is performed by itself has been set as a target object, the client terminal 20 can accordingly start to control the actions of the non-player character indicated by the notification. The content of action control includes the selection as to move or attack, the determination of a movement destination, and the selection of an attacking skill.

In the case of this example, the notification to the effect that a target object for a non-player character has newly been set serves as a notification for permitting action control for the non-player character set as the target object for the client terminal 20 that performs action control for that non-player character.

As an aside, immediately after a target object for a non-player character is set, i.e., immediately after the agent that performs action control for the non-player character is changed (e.g., changed from the server 10 to a client terminal 20), it is possible, due to this change, that the real-time properties of the actions of the non-player character as displayed on the client terminal 20 that does not control the actions of the non-player character become compromised. In order to overcome this shortcoming, immediately after a target object for a non-player character is set, each of the plurality of client terminals 20 may control the movement of that non-player character. This serves to improve the real-time properties of the game even immediately after a target object is set. Note that, as will be described later, in the state where a target object for a non-player character is set, the movement of that non-player character occurs basically in the direction approaching the target object. Thus, even if each of the plurality of client terminals 20 controls the movement of the non-player character, there are substantially no differences in the content of the control, and the differences are only small, if any.

For example, a client terminal 20 for which the target object indicated by the abovementioned notification does not match the player character for which action control is performed by itself, i.e., a client terminal 20 with which the player character for which action control is performed by itself is not set as a target object (hereinafter referred to as a "non-set client terminal 20"), may control, in accordance with the notification, the movement of the non-player character indicated by the notification so that the non-player character indicated by the notification approaches the target object (player character) indicated by the notification. After the movement of the non-player character is controlled in accordance with the notification, each non-set client terminal 20 changes how the non-player character is displayed on the basis of the second NPC action information received from the server 10.

Note that, in the case where each of the plurality of client terminals 20 controls the movement of the non-player character, inconsistencies, even though slight, may occur in the content of the control. In order to solve the inconsistencies, each non-set client terminal 20, upon receiving second NPC action information indicating the content of action control for a non-player character, performed by the client terminal 20 that performs action control for the target object (hereinafter referred to as a "set client terminal 20"), may check whether or not any inconsistency has occurred between the content of the action control for the non-player character performed by itself and the content of the action control for the non-player character performed by the set client terminal 20, and may control the movement of the non-player character so as to correct the inconsistency if any has occurred. Each non-set client terminal 20 assumes that the content of an action of a non-player character as indicated by the second NPC action information received is true, and controls the movement of the non-player character in accordance therewith, i.e., so as to locate the non-player character at a position after performing the movement indicated by the second NPC action information.

Note that, as described earlier, although inconsistencies may occur between the content of the action control performed by each non-set client terminal 20 and the content of the action control performed by the set client terminal 20, since such inconsistencies occur only on the non-set client terminals 20, this is not likely to result in a problem in the game as a whole.

The relay unit 16 receives, via the communication unit 12, second NPC action information indicating the content of an action of a non-player character from the client terminal 20 that performs action control for the non-player character. Then, the relay unit 16 sends the second NPC action information to the other client terminals 20.

Next, an example of the flow of processing by the server 10 will be described. First, an example of an overview of the processing performed by the server 10 will be described by using FIG. 9. The server 10 iteratively performs the flow shown in FIG. 9 for each non-player character. Here, the flow in FIG. 9 will be described while assuming that a first non-player character is the subject of the processing.

In S1, the server 10 determines whether or not a target object for the first non-player character is set. In the case where a target object is set (Yes in S1), the server 10 determines whether the set target object is a player character or a non-player character (S2).

In the case where the target object is a player character (PC in S2), the relay unit 16 performs relay processing (S3). Meanwhile, in the case where the target object is a non-player character (NPC in S2), the first NPC action control unit 11 performs action control, etc. for the first non-player character (S4). Here, for example, an action (e.g., attacking or approaching) with the target object is executed.

In the case where a target object is not set (No in S1), the first NPC action control unit 11 performs action control, etc.

for the first non-player character (S5). Here, for example, an action (e.g., moving or searching) for setting a target object is executed.

Figure 9:
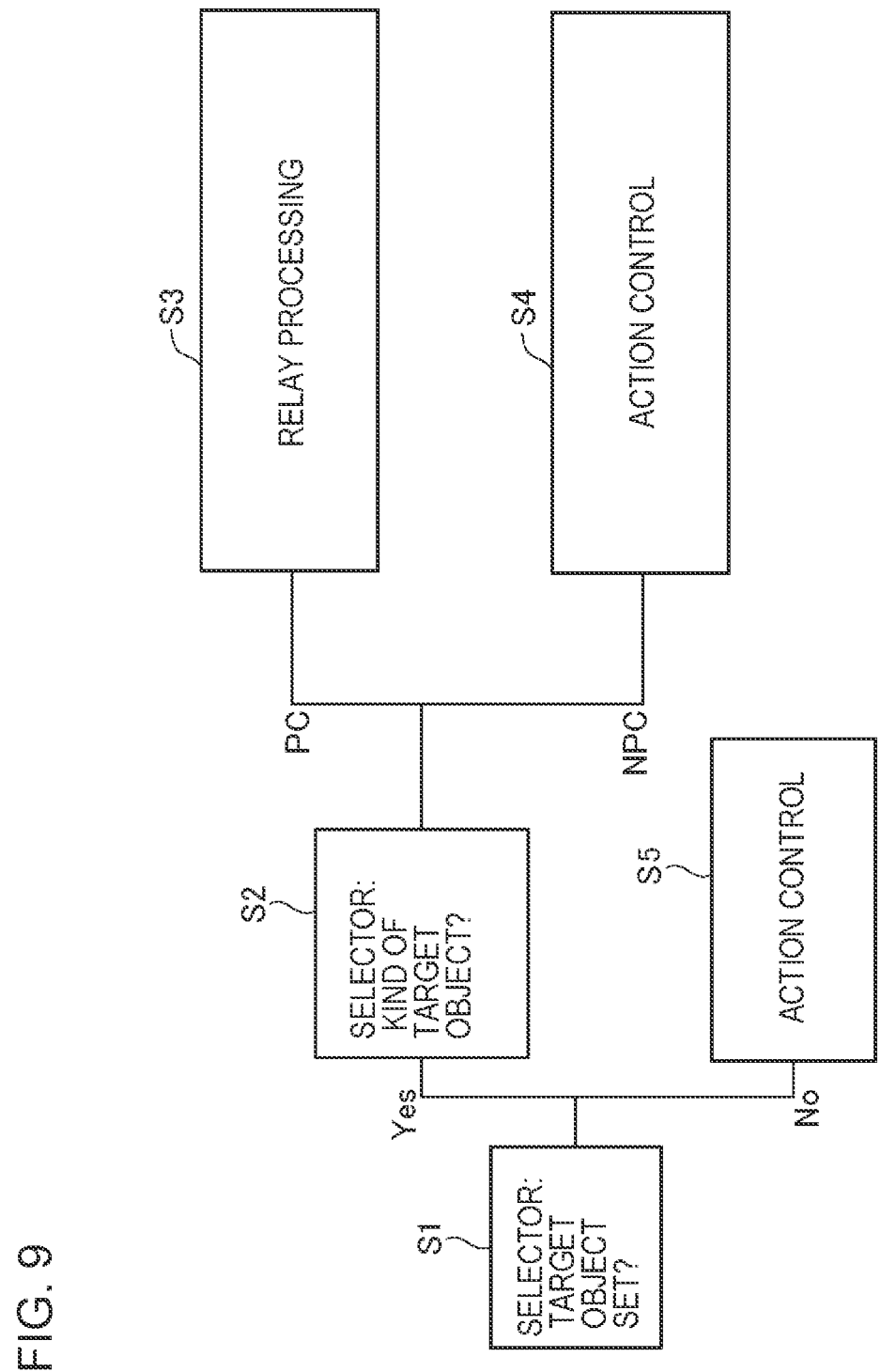
FIG. 9 is a diagram for explaining the flow of processing executed by the server 10 in this embodiment.
Figure 10:
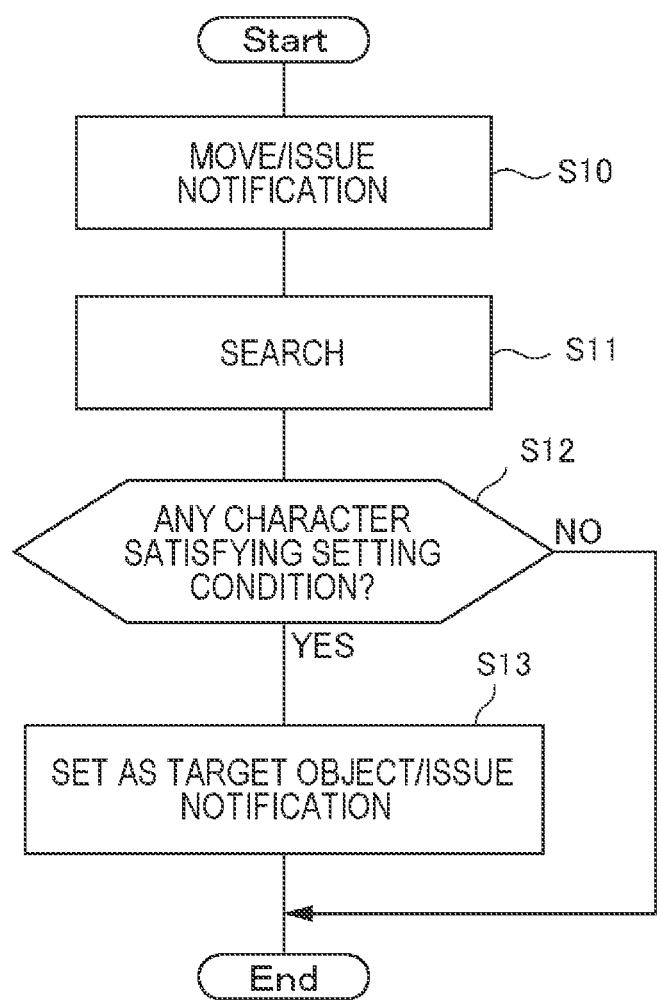
FIG. 10 is a flowchart for explaining the flow of processing executed by the server 10 in this embodiment.

Next, an example of the flow of processing for the action control in S5 in FIG. 9, performed by the server 10 in the case where a target object is not set, will be described by using a flowchart in FIG. 10.

In S10, the first NPC action control unit 11 determines the content of movement (moving direction, moving distance, etc.) of the first non-player character. The method of determining the movement content is a design matter. Then, the notification unit 14 issues a notification of the determined movement content to the client terminals 20.

Then, the target-object setting unit 15 searches for another character satisfying a setting condition at the position after the movement (S11). As an example, the target-object setting unit 15 searches for another character whose distance from the first non-player character is within the reference value L and with which the hatred value of the first non-player character is the greatest among other characters satisfying the positional condition. As another example, a visual field region for non-player characters is set, and a character with which the hatred value of the first non-player character is the greatest among characters in that region is searched for.

In the case where there is a character satisfying the setting condition (Yes in S12), the target-object setting unit 15 sets the character as the target object for the first non-player character (S13). Then, the notification unit 14 issues a notification to that effect to the client terminals 20 (S13).

Meanwhile, in the case where there is no character satisfying the setting condition (No in S12), the processing is terminated.

Figure 11:
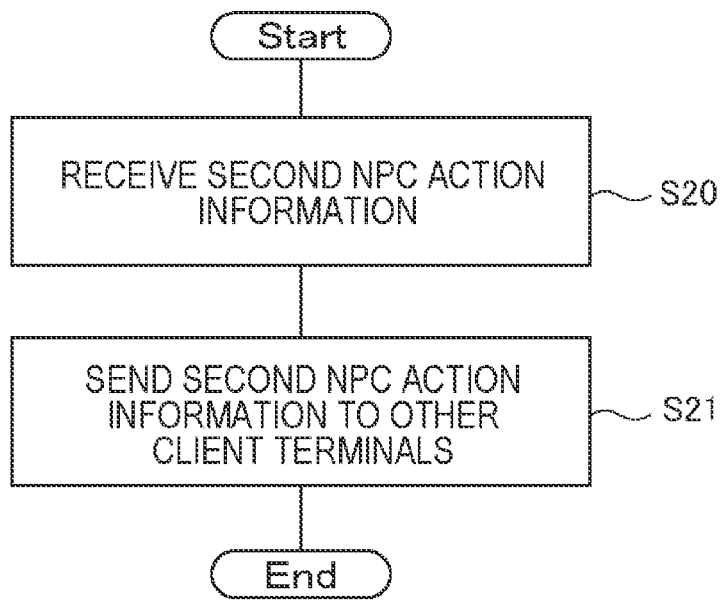
FIG. 11 is a flowchart for explaining the flow of processing executed by the server 10 in this embodiment.

Next, an example of the flow of relay processing in S3 in FIG. 9, performed by the server 10 in the case where a player character is set as a target object, will be described by using a flowchart in FIG. 11.

The relay unit 16 receives second NPC action information indicating the content of an action of the first non-player character from the client terminal 20 that performs action control for the player character set as a target object (S20). Then, the relay unit 16 sends the second NPC action information to the other client terminals 20 (S21).

Upon receiving the second NPC action information (S20), the server 10 updates the management data (hit points, etc.) associated with the non-player character on the basis of the second NPC action information received. The client terminals 20 are also notified of the management data associated with the non-player character, and the data at the server 10 is always considered as being true for the purpose of fraud prevention.

Figure 12:
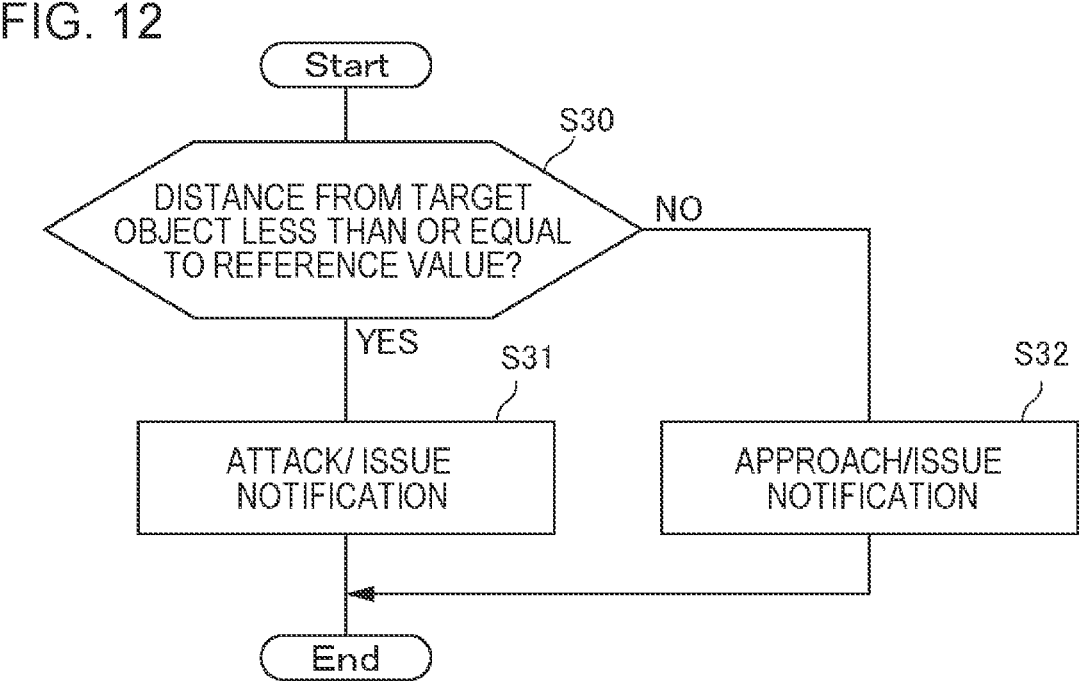
FIG. 12 is a flowchart for explaining the flow of processing executed by the server 10 in this embodiment.

Next, an example of the flow of processing for the action control in S4 in FIG. 9, performed by the server 10 in the case where a non-player character is set as a target object, will be described by using a flowchart in FIG. 12.

In S30, the first NPC action control unit 11 determines whether the distance between the first non-player character and the target object is less than or equal to a reference value.

In the case where the distance is less than or equal to the reference value (Yes in S30), the first NPC action control unit 11 determines that an attack is to be performed on the target object as well as the content of the attack (e.g., attacking skill) (S31). Then, the notification unit 14 issues a notification of the determined attack content to the client terminals 20 (S31).

Meanwhile, in the case where the distance is greater than the reference value (No in S30), the first NPC action control unit 11 determines that the target object is to be approached, as well as the content of the approaching (moving direction, moving distance, etc.) (S32). Then, the notification unit 14 issues a notification of the determined approaching content to the client terminals 20 (S32).

"Configuration of Client Terminals 20"

The configuration of the client terminals 20 will be described in detail below. First, an example of the hardware configuration of a client terminal 20 will be described. Each of the functional units provided in each client terminal 20 in this embodiment is realized by an arbitrary combination of hardware and software, which mainly involves a CPU of an arbitrary computer, a memory, programs loaded into the memory, a storage unit such as a hard disk that stores the programs (which may store programs already stored before the shipping of the device, as well as programs stored on a storage medium such as a CD or downloaded from a server on the Internet or the like), and a network connection interface. Furthermore, it will be understood by a person skilled in the art that there are various modifications concerning the methods and devices for realizing the functional units. An example of the hardware configuration of each client terminal 20 is shown in FIG. 3, similarly to the server 10.

Figure 13:
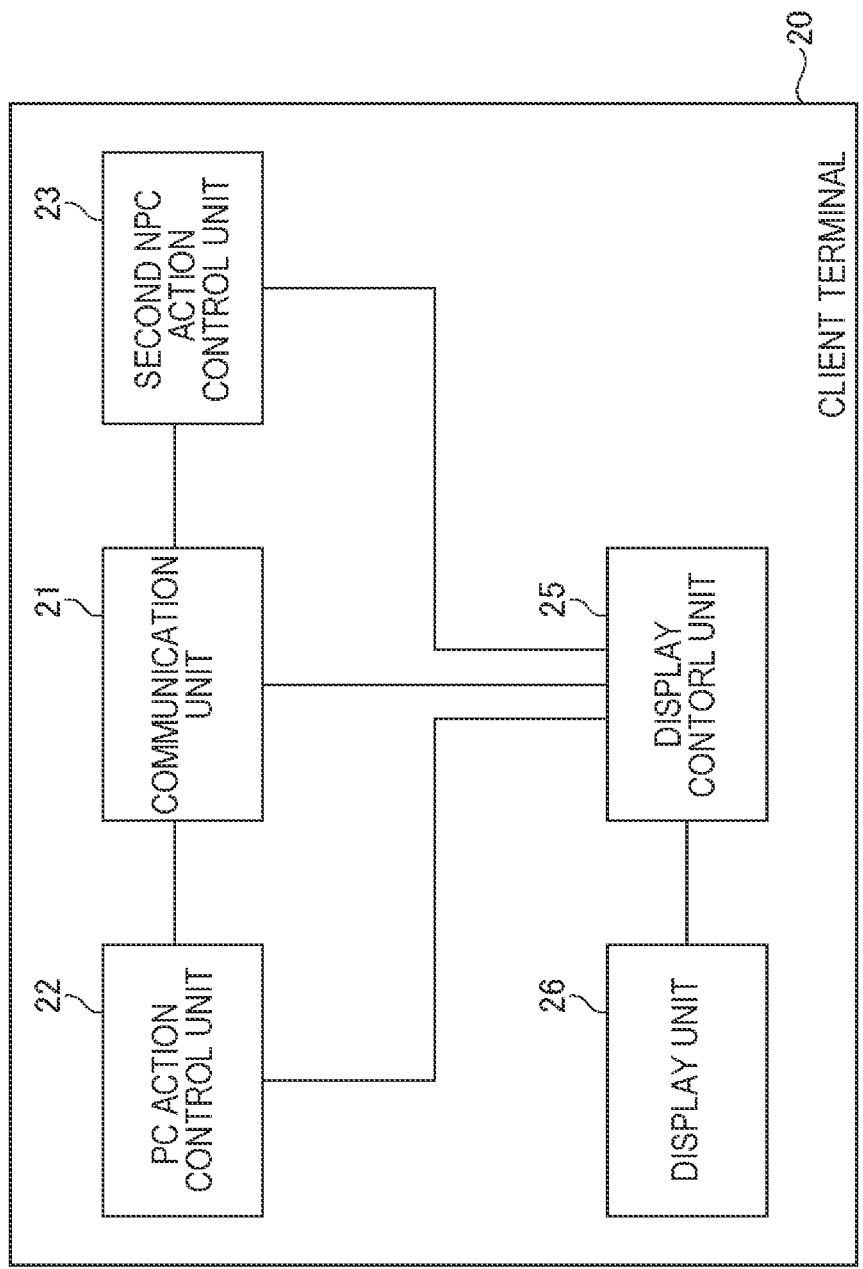
FIG. 13 is a diagram showing an example of functional blocks of the client terminal 20 in this embodiment.

Next, the functional configuration of the client terminals 20 will be described. FIG. 13 shows an example functional block diagram of each client terminal 20. As shown in the figure, the client terminal 20 includes a communication unit 21, a PC action control unit 22, a second NPC action control unit 23, a display control unit 25, and a display unit 26.

The communication unit 21 communicates with the server 10 via a network such as the Internet.

For example, the communication unit 21 sends, to the server 10, information indicating the content of an action of the player character (PC action information) for which action control has been performed by the client terminal 20 on the basis of a player input.

Furthermore, for example, the communication unit 21 sends, to the server 10, information indicating the content of an action of a non-player character (second NPC action information) for which action control has been performed by the client terminal 20.

Furthermore, for example, the communication unit 21 receives, from the server 10, information indicating the content of an action of a non-player character (first NPC action information) for which action control has been performed by the server 10.

Furthermore, the communication unit 21 receives, from the server 10, information indicating the content of an action (PC action information) of the player character for which action control has been performed by another client terminal 20.

Furthermore, for example, the communication unit 21 receives, from the server 10, information indicating the content of an action of a non-player character (second NPC action information) for which action control has been performed by another client terminal 20.

Note that the communication unit 21 can send other information to the server 10 and can receive other information from the server 10.

The PC action control unit 22 performs action control for the player character on the basis of player inputs and sends PC action information indicating the content of the actions of the player character to the server 10. The content of action control includes the selection as to whether to move or attack, the determination of a movement destination, and the selection of an attacking skill. The content of actions indicated by the PC action information includes the kind of action (movement, attack, etc.), the moving direction, the moving distance, and the selected attacking skill.

The second NPC action control unit 23, on the basis of a notification from the server 10, manages information indicating whether or not the local client terminal 20 is in a state permitted to control the actions of a non-player character. As described earlier, the notification unit 14 of the server 10 issues a notification for permitting action control for a non-player character to the client terminal 20 that performs action control for the player character set as the target object for that non-player character. The second NPC action control unit 23, on the basis of this notification from the server 10, manages information indicating whether or not the local client terminal 20 is in a state permitted to control the actions of a non-player character.

Then, in the case where the local client terminal 20 is in a state permitted to control the actions of a non-player character, the second NPC action control unit 23 performs action control for that non-player character. Specifically, the second NPC action control unit 23 executes processing similar to the action control in S4 in FIG. 9, e.g., a flow in FIG. 12. Then, the second NPC action control unit 23 sends, to the server 10, second NPC action information indicating the content of an action of the non-player character for which action control has been performed. The action content indicated by the second NPC action information includes the kind of action (movement, attack, etc.), the moving direction, the moving distance, and the selected attacking skill.

The display control unit 25 updates information displayed on the display unit (display) 26 on the basis of the PC action information, the first NPC action information, the second NPC action information, etc. For example, the position of a character is moved, or information indicating a predetermined action (e.g., an attack) performed by a character is displayed.

"Operations and Advantages"

With the game system 1 according to the embodiment described above, it is possible to control the actions of a non-player character with the computer on the client terminal 20 side. By letting the computer on the client terminal 20 side control the actions of both the player character and a non-player character, the real-time properties in displaying mutual responses to actions performed between the player character and the non-player character are improved.

Note that, since a plurality of client terminals 20 exist, the problem with the real-time properties is not alleviated unless control is executed so that suitable client terminals 20 control the actions of suitable non-player characters. For example, the problem with the real-time properties is not alleviated even if the client terminal 20 that performs action control for a second player character performs action control for a first non-player character while the first player character is engaged in a battle with a first non-player character.

This problem can also be alleviated with the game system 1 according to this embodiment. In the game system 1 according to this embodiment, the actions of a non-player character are controlled by the client terminal 20 that performs action control for a player character, with which that non-player character is set as a target on which a predetermined action (e.g., an attack) is to be taken. That is, the actions of a non-player character are controlled by the client terminal 20 that performs action control for a player character that has been set as a target object and thus has become likely to mutually take a predetermined action (e.g., an attack) with that non-player character. With the game system 1 according to the embodiment described above, suitable client terminals 20 control the actions of suitable non-player characters, which serves to alleviate the problem with the real-time properties.

Furthermore, with the game system 1 according to this embodiment, in the case where a client terminal 20 performs action control for a non-player character, it is possible to send information indicating the content of an action of the non-player character (second NPC action information) for which action control has been performed by the client terminal 20 to the other client terminals 20 via the server 10. Thus, even if the configuration is such that a client terminal 20 performs action control for a non-player character, it is possible to run the game at all the client terminals 20 without causing a problem.

"Modifications"

Here, modifications of the game system 1 according to this embodiment will be described. In the example described above, the hatred value is used as a first parameter value, and the target-object setting unit 15 sets a target object for a non-player character on the basis of the hatred value. In a modification, another parameter value may be used as a first parameter value, and the target-object setting unit 15 may set a target object for a non-player character on the basis of the other parameter value.

For example, the hit points, the level, the amount of currency, or the like may be used as a first parameter value. Furthermore, the target-object setting unit 15 may set, as the target object for a non-player character, a character having the greatest or least hit points, level, or amount of currency among other characters having distances within the reference value L from the non-player character.

Alternatively, the target-object setting unit 15 may set, as the target object for a non-player character, a character having the greatest or least hit points, level, or amount of currency among other characters whose distances from the non-player character are within the reference value L and with which there is no predetermined obstacle between the non-player character and themselves.

With these modifications, it is also possible to realize operations and advantages similar to those of the game system 1 according to the embodiment.

Second Embodiment

"Overview"

A game system 1 according to this embodiment differs from the game system 1 according to the first embodiment in that, while a client terminal 20 is performing action control for a non-player character, the server 10 monitors a predetermined state and performs control to change the agent that performs action control for the non-player character to another agent in accordance with the state. The configuration is otherwise the same as that in the first embodiment. The game system 1 according to this embodiment will be described below in detail.

"Configuration of Server 10"

An example of the hardware configuration of the server 10 is the same as that in the first embodiment.

An example functional block diagram of the server 10 is shown in FIG. 4, similarly to the first embodiment. As shown in the figure, the server 10 includes a first NPC action control unit 11, a communication unit 12, a management unit 13, a notification unit 14, a target-object setting unit 15, and a relay unit 16. The first NPC action control unit 11, the communication unit 12, the management unit 13, the notification unit 14, and the relay unit 16 are configured the same as those in the first embodiment.

Similarly to the first embodiment, the target-object setting unit 15 sets a target object for each non-player character on the basis of a first parameter value of that non-player character. Specifically, the target-object setting unit 15 searches for another character satisfying a setting condition defined on the basis of the first parameter value and sets the other character satisfying the setting condition as a target object. As described earlier in the context of the first embodiment, for example, the setting condition is that "the distance from a first non-player character is within a reference value L and that the first parameter value is the greatest (or the least) among other characters satisfying the positional condition".

Then, even when a target object is set for the first non-player character, the target-object setting unit 15 repeatedly searches for another character satisfying the setting condition in association with the first non-player character. Then, the target-object setting unit 15 executes processing in accordance with the result of the searching. The processing by the target-object setting unit 15 will be described below, individually for a plurality of cases.

—Case 1—

For example, when a first player character is set as the target object for a first non-player character, if it is determined that the first player character no longer satisfies the setting condition and a second player character comes to satisfy the setting condition, the target-object setting unit 15 discharges the first player character from the target object for the first non-player character and sets the second player character as the target object for the first non-player character.

As the game proceeds, the hatred values of the first non-player character, the positional relationships between the first non-player character and the other characters, etc. change. In accordance with such changes, such a situation may occur in which the first player character no longer satisfies the setting condition and the second player character comes to satisfy the setting condition.

In accordance with the abovementioned discharging and setting, the notification unit 14 issues a notification for permitting action control for the first non-player character to the client terminal 20 that performs action control for the second player character. Furthermore, the notification unit 14 issues a notification for not permitting action control for the first non-player character to the client terminal 20 that performs action control for the first player character.

For example, the notification unit 14 issues a notification to the plurality of client terminals 20 to the effect that the second player character has been set as the target object for the first non-player character. The content of the notification includes information identifying the first non-player character and information identifying the target object for the first non-player character.

The client terminal 20 that performs action control for the second player character can recognize that the second player character, for which action control is performed by itself, has been set as the target object for the first non-player character by determining whether or not the target object indicated by the notification coincides with the second player character, for which action control is performed by itself, and can start action control for the first non-player character accordingly.

Furthermore, the client terminal 20 that performs action control for the first player character can recognize that the first player character, for which action control is performed by itself, is not set as the target object for the first non-player character by determining whether or not the target object indicated by the notification coincides with the first player character, for which action control is performed by itself, and can terminate action control for the first non-player character accordingly.

In the case of this example, a notification that a target object for a non-player character has newly been set serves as a notification for permitting action control for the non-player character for the client terminal 20 that performs action control for the player character set as the target object, and serves as a notification for not permitting action control for the non-player character for the other client terminals 20.

—Case 2—

For example, when a first player character is set as the target object for a first non-player character, if it is determined that the first player character no longer satisfies the setting condition and another second non-player character comes to satisfy the setting condition, the target-object setting unit 15 discharges the first player character from the target object for the first non-player character and sets the second non-player character as the target object for the first non-player character. In accordance with the discharging and setting, the first NPC action control unit 11 starts action control for the first non-player character.

In accordance with the abovementioned discharging and setting, the notification unit 14 issues a notification for not permitting action control for the first non-player character to the client terminal 20 that performs action control for the first player character.

For example, the notification unit 14 issues a notification to the plurality of client terminals 20 to the effect that the second non-player character has been set as the target object for the first non-player character. The content of the notification includes information identifying the first non-player character and information identifying the target object for the first non-player character.

The client terminal 20 that performs action control for the first player character can recognize that the first player character, for which action control is performed by itself, is not set as the target object for the first non-player character by determining whether or not the target object indicated by the notification coincides with the first player character, for which action control is performed by itself, and can terminate action control for the first non-player character accordingly.

In the case of this example, a notification that a target object for a non-player character has newly been set serves as a notification for not permitting action control for that non-player character.

Next, an example of an overview of processing performed by the server 10 will be described by using FIG. 14. The server 10 iteratively performs the flow shown in FIG. 14 for each non-player character. Here, the flow in FIG. 14 will be described while assuming that a first non-player character is the subject of the processing.

In S1, the server 10 determines whether or not a target object for the first non-player character is set. In the case where a target object is set (Yes in S1), the server 10 determines whether the set target object is a player character or a non-player character (S2).

In the case where the target object is a player character (PC in S2), the relay unit 16 performs relay processing (S3). Furthermore, the target-object setting unit 15 performs state checking, etc. (S3).

Meanwhile, in the case where the target object is a non-player character (NPC in S2), the first NPC action control unit 11 performs action control, etc. for the first non-player character (S4). Here, for example, an action (e.g., attacking or approaching) with the target object is executed.

In the case where a target object is not set (No in S1), the first NPC action control unit 11 performs action control, etc. for the first non-player character (S5). Here, for example, an action (e.g., moving or searching) for setting a target object is executed.

Examples of the relay processing in S3, the action control in S4, and the action control in S5 are the same as those in the first embodiment.

Next, the flow of an example of the state check processing in S3 in FIG. 14, performed by the server 10 in the case where a player character is set as a target object, will be described by using a flowchart in FIG. 15.

First, the target-object setting unit 15 searches for another character satisfying the setting condition (S40). For example, the target-object setting unit 15 searches for another character whose distance from the first non-player character is within the reference value L and for which the first parameter value is the greatest (or the least) among other characters satisfying the positional relationship.

In the case where there is a character satisfying the setting condition (Yes in S41), the target-object setting unit 15 determines whether or not the newly searched character coincides with the target object currently set (S42).

In the case where these characters coincide with each other (Yes in S42), the processing is terminated. Meanwhile, in the case where these characters do not coincide with each other (No in S42), the target-object setting unit 15 sets the newly searched character as the target object for the first non-player character (S43). Then, the notification unit 14 notifies the client terminals 20 to that effect (S43). Due to the setting in S43, the character that has been set as the target object for the first non-player character is discharged from the target object for the first non-player character.

Meanwhile, in the case where there is no character satisfying the setting condition (No in S41), the target-object setting unit 15 discharges the target object currently set (S44). Then, the notification unit 14 notifies the client terminals 20 to that effect (S44). In the state resulting from this discharging in S44, no target object for the first non-player character is set.

"Configuration of Client Terminal 20"

An example of the hardware configuration of the client terminals 20 is the same as that in the first embodiment.

An example of the functional block diagram of each client terminal 20 is shown in FIG. 13, similarly to the first embodiment. As shown in the figure, the client terminal 20 includes a communication unit 21, a PC action control unit 22, a second NPC action control unit 23, a display control unit 25, and a display unit 26. The communication unit 21, the PC action control unit 22, the display control unit 25, and the display unit 26 are configured the same as those in the first embodiment.

As described in the context of the first embodiment, the second NPC action control unit 23, on the basis of notifications from the server 10, manages information indicating whether or not the local client terminal 20 is in a state permitted to perform action control for a non-player character.

Note that, in addition to a notification for permitting action control for a non-player character, each client terminal 20 in this embodiment can receive a notification for not permitting action control for that non-player character. On the basis of these notifications, the second NPC action control unit 23 manages information indicating whether or not the local client terminal 20 is in a state permitted to perform action control for a non-player character.

"Operations and Advantages"

With the game system 1 according to the embodiment described above, it is possible to realize operations and advantages similar to those in the first embodiment.

Furthermore, with the game system 1 according to this embodiment, even after a character is set as a target object for a non-player character, it is possible to change the target object to another character in accordance with state changes as the game proceeds. Thus, it is possible to realize a game with rich variety such that the situation continues to change as the game proceeds. Furthermore, with the game system 1 according to this embodiment, when the target object is changed, it is possible to accordingly change the agent that performs action control for the non-player character. Thus, it is possible to alleviate the problem with the real-time properties, while realizing such a game with rich variety.

Third Embodiment

"Overview"

Similarly to the second embodiment, a game system 1 according to this embodiment differs from the game system 1 according to the first embodiment in that, while a client terminal 20 is performing action control for a non-player character, the server 10 monitors a predetermined state and performs control to change the agent that performs action control for the non-player character to another agent in accordance with the state. The configuration is otherwise the same as that in the first embodiment. The game system 1 according to this embodiment will be described below in detail.

"Configuration of Server 10"

An example of the hardware configuration of the server 10 is the same as that in the first or second embodiment.

An example functional block diagram of the server 10 is shown in FIG. 4, similarly to the first and second embodiments. As shown in the figure, the server 10 includes a first NPC action control unit 11, a communication unit 12, a management unit 13, a notification unit 14, a target-object setting unit 15, and a relay unit 16. The first NPC action control unit 11, the communication unit 12, the notification unit 14, the target-object setting unit 15, and the relay unit 16 are configured the same as those in the first or second embodiment.

In the state where a client terminal 20 is permitted to perform action control for a first non-player character, the management unit 13 monitors whether or not a second parameter value of a player character set as the target object for the first non-player character satisfies a numerical condition. The second parameter value is, for example, the "hit points", and the numerical condition is, for example, that "the hit points are zero". When the hit points become zero, the game is over.

Then, when the second parameter value of the player character set as the target object for the first non-player character satisfies the numerical condition, the management unit 13 discharges the player character from the target object for the first non-player character. In the state resulting from this discharging, no target object for the first non-player character is set. As a result, the state changes to a state in which the client terminal 20 is not permitted to perform action control for the first non-player character.

In accordance with the discharging, the first NPC action control unit 11 starts to perform action control for the first non-player character. Furthermore, the notification unit 14 may issue a notification to the plurality of client terminals 20 to the effect that a target object for the first non-player character is not set.

The management unit 13 may be provided with at least some of the functions described in the context of the first and second embodiments, e.g., all of those functions, in addition to the functions described here.

Figure 14:
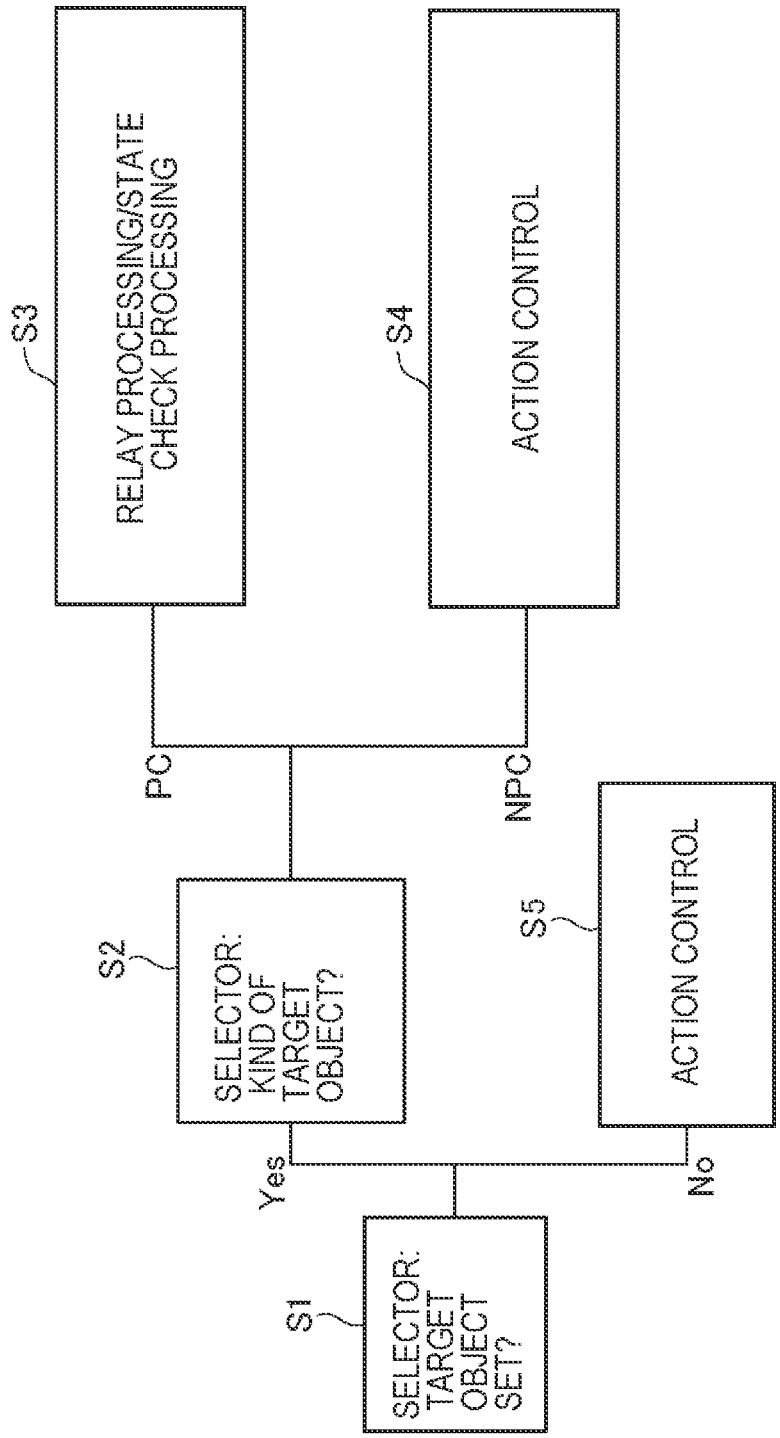
FIG. 14 is a diagram for explaining the flow of processing executed by the server 10 in this embodiment.

Similarly to the second embodiment, the server 10 in this embodiment iteratively performs the flow shown in FIG. 14 for each non-player character. Examples of the relay processing in S3, the action control in S4, and the action control in S5 are the same as those in the first embodiment.

Next, the flow of an example of the state check processing in S3 in FIG. 14, performed by the server 10 in the case where a first player character is set as the target object for a first non-player character, will be described by using a flowchart in FIG. 16.

First, the management unit 13 determines whether or not the hit points of the player character set as the target object for the first non-player character satisfies the numerical condition (that the hit points are zero) (S50).

In the case where the numerical condition is satisfied (Yes in S50), the management unit 13 discharges the player character from the target object for the first non-player character (S51). In the state resulting from this discharging in S51, no target object for the first non-player character is set.

Meanwhile, in the case where the numerical condition is not satisfied (No in S50), the processing is terminated.

Figure 15:
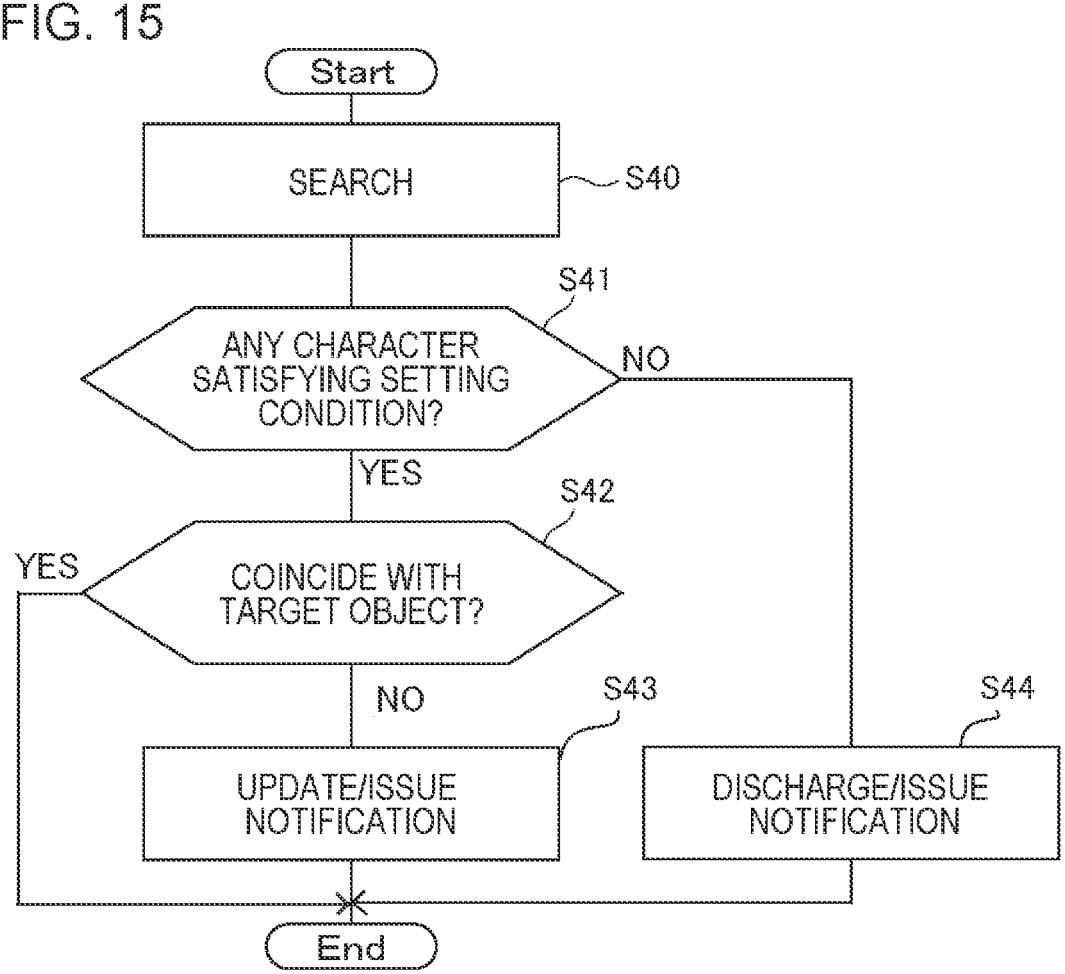
FIG. 15 is a flowchart for explaining the flow of processing executed by the server 10 in this embodiment.
Figure 16:
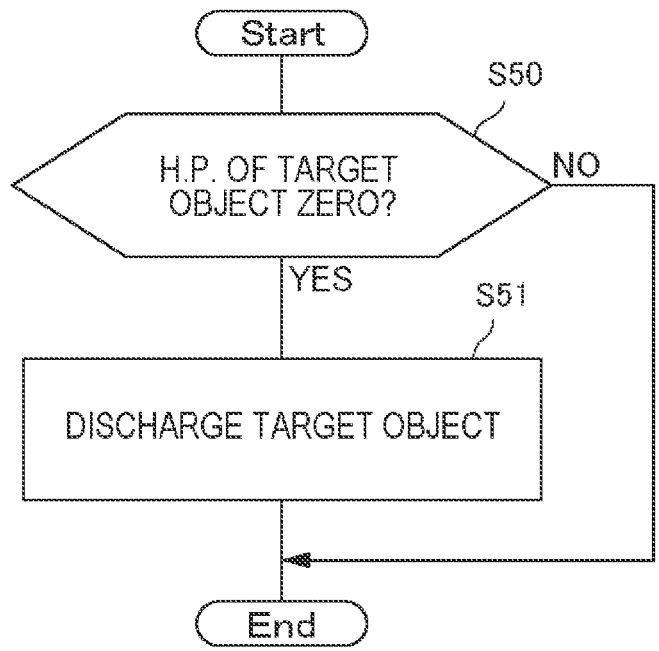
FIG. 16 is a flowchart for explaining the flow of processing executed by the server 10 in this embodiment.

Note that, in the state check processing in S3 in FIG. 14, in addition to the above processing described by using the flowchart in FIG. 16, the above processing described by using the flowchart in FIG. 15 in the context of the second embodiment may be performed.

"Configuration of Client Terminals 20"

The hardware configuration and functional configuration of the client terminals 20 are the same as those in the first or second embodiment.

Note that the game is over in the case where the hit points of the player character set as the target object satisfy the numerical condition (that the hit points are zero). Accordingly, the PC action control unit 22 terminates action control for the player character, and the second NPC action control unit 23 terminates action control for the non-player character.

"Operations and Advantages"

With the game system 1 according to the embodiment described above, it is possible to realize operations and advantages similar to those in the first and second embodiments.

Furthermore, with the game system 1 according to this embodiment, it is possible to monitor the state of a player character for which action control is performed by a client terminal 20 performing action control for a non-player character and to transfer the agent that performs action control for the non-player character to the server 10 when a game-over is detected. Thus, even if a situation in which a player character set as a target object leaves the game occurs as a result of a game-over for that player character, it is possible to swiftly change the agent that performs action control for the non-player character to the server 10, which allows the game to proceed smoothly.

Fourth Embodiment

"Overview"

Similarly to the second and third embodiments, a game system 1 according to this embodiment differs from the game system 1 according to the first embodiment in that, while a client terminal 20 is performing action control for a non-player character, the server 10 monitors a predetermined state and performs control to change the agent that performs action control for the non-player character to another agent in accordance with the state. The configuration is otherwise the same as that in the first embodiment. The game system 1 according to this embodiment will be described below in detail.

"Configuration of Server 10"

An example of the hardware configuration of the server 10 is the same as that in one of the first to third embodiments.

An example functional block diagram of the server 10 is shown in FIG. 4, similarly to the first to third embodiments. As shown in the figure, the server 10 includes a first NPC action control unit 11, a communication unit 12, a management unit 13, a notification unit 14, a target-object setting unit 15, and a relay unit 16. The first NPC action control unit 11, the communication unit 12, the notification unit 14, the target-object setting unit 15, and the relay unit 16 are configured the same as those in one of the first to third embodiments.

In the state where a first player character is set as the target object for a first non-player character and the client terminal 20 that performs action control for the first player character is permitted to perform action control for the first non-player character, the management unit 13 monitors whether or not communication between the client terminal 20 and the server 10 is disconnected.

Then, when a disconnection of communication is detected, the management unit 13 discharges the first player character from the target object for the first non-player character. In the state resulting from this discharging, no target object for the first non-player character is set. As a result, the state is changed to a state in which the client terminal 20 is not permitted to perform action control for the first non-player character.

In accordance with the discharging, the first NPC action control unit 11 starts to perform action control for the first non-player character. Furthermore, the notification unit 14 may issue a notification to the plurality of client terminals 20 to the effect that a target object for the first non-player character is not set.

The management unit 13 may be provided with at least some of the functions described in the context of the first to third embodiments, e.g., all of those functions, in addition to the functions described here.

Similarly to the second and third embodiments, the server 10 in this embodiment iteratively performs the flow shown in FIG. 14 for each non-player character. Examples of the relay processing in S3, the action control in S4, and the action control in S5 are the same as those in the first embodiment.

Next, the flow of an example of the state check processing in S3 in FIG. 14, performed by the server 10 in the case where a first player character is set as the target object for a first non-player character, will be described by using a flowchart in FIG. 17.

First, the management unit 13 determines whether or not communication is disconnected between the client terminal 20 that performs action control for the first player character set as the target object for the first non-player character and the server 10 (S60). The determination method is not particularly limited, and the determination may be realized by using any technique.

In the case where the communication is disconnected (Yes in S60), the management unit 13 discharges the first player character from the target object for the first non-player character (S61). In the state resulting from the discharging in S61, no target object for the first non-player character is set.

Meanwhile, in the case where the communication is not disconnected (No in S60), the processing is terminated.

Figure 17:
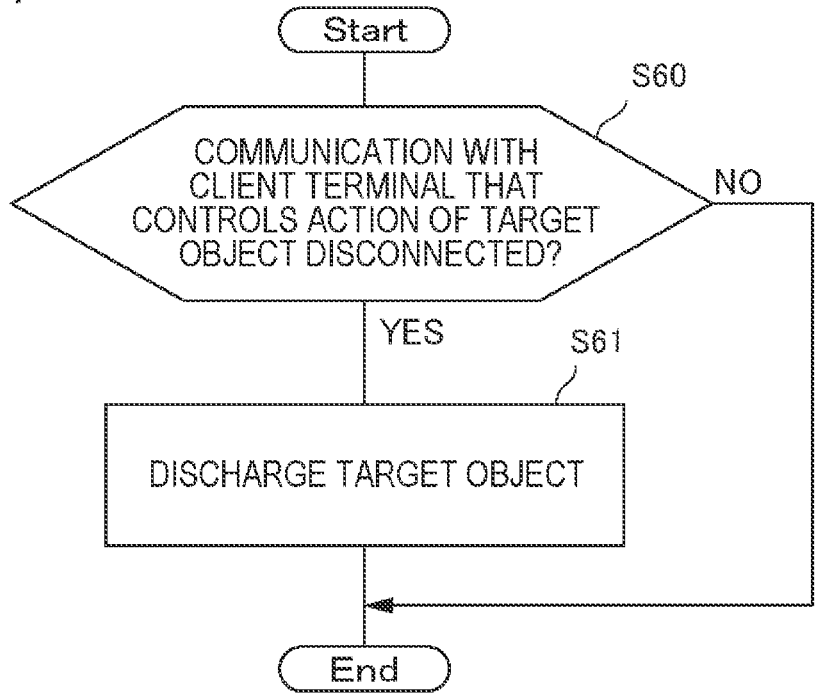
FIG. 17 is a flowchart for explaining the flow of processing executed by the server 10 in this embodiment.

Note that, in the state check processing in S3 in FIG. 14, in addition to the above processing described by using the flowchart in FIG. 17, at least one of the above processing described by using the flowchart in FIG. 15 in the context of the second embodiment and the above processing described by using the flowchart in FIG. 16 in the context of the third embodiment may be performed.

"Configuration of Client Terminals 20"

The hardware configuration and functional configuration of the client terminals 20 are the same as those in one of the first to third embodiments.

"Operations and Advantages"

With the game system 1 according to the embodiment described above, it is possible to realize operations and advantages similar to those in the first to third embodiments.

Furthermore, with the game system 1 according to this embodiment, it is possible to monitor the communication status between a client terminal 20 performing action control for a non-player character and the server 10 and to swiftly transfer the agent that performs action control for the non-player character to the server 10 when a disconnection of communication is detected. Thus, even when a disconnection of communication occurs between the client terminal 20 performing action control for the non-player character and the server 10, it is possible to let the game proceed smoothly.

Fifth Embodiment

"Overview"

Similarly to the second to fourth embodiments, a game system 1 according to this embodiment differs from the game system 1 according to the first embodiment in that, while a client terminal 20 is performing action control for a non-player character, the server 10 monitors a predetermined state and performs control to change the agent that performs action control for the non-player character to another agent in accordance with the state. The configuration is otherwise the same as that in the first embodiment. The game system 1 according to this embodiment will be described below in detail.

"Configuration of Server 10"

An example of the hardware configuration of the server 10 is the same as that in one of the first to fourth embodiments.

An example functional block diagram of the server 10 is shown in FIG. 4, similarly to the first to fourth embodiments. As shown in the figure, the server 10 includes a first NPC action control unit 11, a communication unit 12, a management unit 13, a notification unit 14, a target-object setting unit 15, and a relay unit 16. The first NPC action control unit 11, the communication unit 12, the notification unit 14, the target-object setting unit 15, and the relay unit 16 are configured the same as those in one of the first to fourth embodiments.

The management unit 13 monitors the state of a first non-player character while a first player character is set as the target object for the first non-player character.

Here, the state of the first non-player character, monitored by the management unit 13, will be described. A non-player character enters an action-prohibited state if a predetermined condition is satisfied in the case where the non-player character is attacked by another character. While in the action-prohibited state, the non-player character cannot execute actions such as moving and attacking. When a returning condition (e.g., the elapse of a predetermined time or being subjected to a predetermined action by another character) is satisfied after the non-player character enters the action-prohibited state, the non-player character returns to a normal state in which actions such as moving and attacking can be taken.

While the first player character is set as the target object for the first non-player character, the management unit 13 manages whether or not the first non-player character is in the action-prohibited state. Then, upon detecting that the first non-player character is in the action-prohibited state, the management unit 13 discharges the first player character from the target object for the first non-player character. In the state resulting from this discharging, no target object for the first non-player character is set. As a result, the state changes to a state in which the client terminal 20 is not permitted to perform action control for the first non-player character.

In accordance with the discharging, the notification unit 14 may issue a notification to the plurality of client terminals 20 to the effect that a target object for the first non-player character is not set. When the first non-player character returns to the normal state after the discharging, the first NPC action control unit 11 starts to perform action control for the first non-player character.

The management unit 13 may be provided with at least some of the functions described in the context of the first to fourth embodiments, e.g., all of those functions, in addition to the functions described here.

Similarly to the second to fourth embodiments, the server 10 in this embodiment iteratively performs the flow shown in FIG. 14 for each non-player character. Examples of the relay processing in S3, the action control in S4, and the action control in S5 are the same as those in the first embodiment.

Next, the flow of an example of the state check processing in S3 in FIG. 14, performed by the server 10 in the case where a first player character is set as the target object for a first non-player character, will be described by using a flowchart in FIG. 18.

First, the management unit 13 determines whether or not the first non-player character is in the action-prohibited state (S70).

In the case where the first non-player character is in the action-prohibited state (Yes in S70), the management unit 13 discharges the first player character from the target object for the first non-player character (S71). Then, the notification unit 14 issues a notification to that effect to the client terminals 20 (S71). In the state resulting from the discharging in S71, no target object for the first non-player character is set.

Meanwhile, in the case where the first non-player character is not in the action-prohibited state (No in S70), the processing is terminated.

Figure 18:
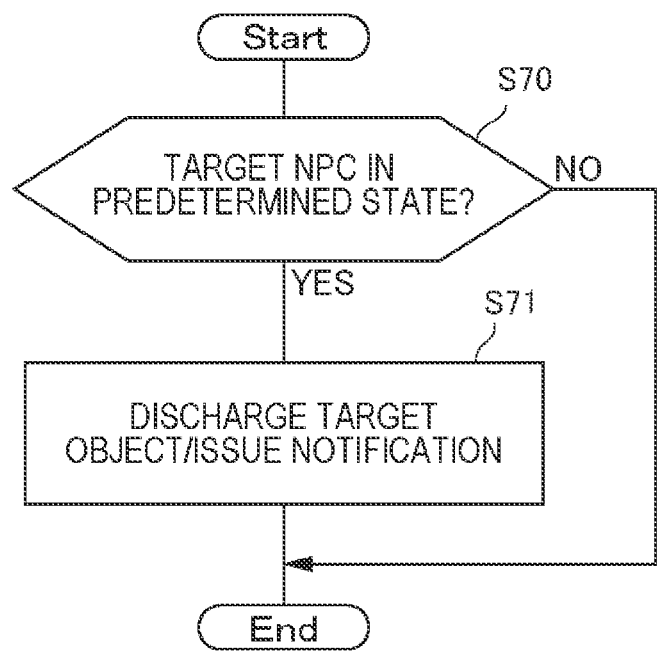
FIG. 18 is a flowchart for explaining the flow of processing executed by the server 10 in this embodiment.

Note that, in the state check processing in S3 in FIG. 14, in addition to the above processing described by using the flowchart in FIG. 18, at least one of the above processing described by using the flowchart in FIG. 15 in the context of the second embodiment, the above processing described by using the flowchart in FIG. 16 in the context of the third embodiment, and the above processing described by using the flowchart in FIG. 17 in the context of the fourth embodiment may be performed.

"Configuration of Client Terminals 20"

The hardware configuration and functional configuration of the client terminals 20 are the same as those in one of the first to fourth embodiments.

"Operations and Advantages"

With the game system 1 according to the embodiment described above, it is possible to realize operations and advantages similar to those in the first to fourth embodiments.

Furthermore, with the game system 1 according to this embodiment, it is possible to monitor the state of a non-player character for which a client terminal 20 is performing action control and to transfer the agent that performs action control for the non-player character to the server 10 when it is detected that the non-player character has entered an action-prohibited state. Predetermined actions are not performed mutually between a non-player character in the action-prohibited state and other characters. There is no need for a client terminal 20 to perform such action control for a non-player character. With the game system 1 according to this embodiment, action control for a non-player character can be performed by a suitable agent.

This application claims the right of priority based on Japanese Patent Application No. 2018-135588 filed on 19 Jul. 2018, and incorporates the entire disclosure thereof herein.

The invention claimed is:

1. A game system comprising a server and a client terminal,
wherein the server comprises:
a first non-player character (NPC) action control unit that controls a non-player object and sends first NPC action information indicating first action content of the non-player object to the client terminal;
a management unit that manages a first parameter value in association with the non-player object and a plurality of player objects;
a target-object setting unit that sets a target object based on the first parameter value, the target object being a first player object among the plurality of player objects on which the non-player object performs a predetermined action comprising a plurality of action contents for a battle scene; and
a notification unit that issues a notification for permitting action control for the non-player object to the client terminal that controls the first player object set as the target object, and
wherein the client terminal comprises:
a second NPC action control unit that controls second action content of the non-player object for the predetermined action based on receiving the notification from the server,
wherein the plurality of action contents comprise the first action content and the second action content, and
wherein the non-player object is controlled by the server and the client terminal during the predetermined action based on the first action content and the second action content,
wherein the management unit manages state information indicating whether or not the client terminal is in a state permitted to perform action control for the non-player object,
wherein the first NPC action control unit controls the non-player object based on the state information, and
wherein, when a second parameter value of the first player object set as the target object satisfies a numerical condition in the state in which the client terminal is permitted to perform action control for the non-player object, the management unit changes the state information to a state in which the client terminal is not permitted to perform action control for the non-player object.

2. A game system according to claim 1,
wherein, upon controlling the non-player object based on the notification, the second NPC action control unit sends second NPC action information indicating the second action content of the non-player object to the server, and
wherein the server further includes a relay unit that receives the second NPC action information and sends the second NPC action information to another client terminal.

3. A game system according to claim 1,
wherein the client terminal includes a player character (PC) action control unit that controls the first player object based on a player input and sends PC action information indicating action content of the first player object to the server,
wherein the management unit changes the first parameter value based on the action content of the first player object, indicated by the PC action information, and
wherein the target-object setting unit sets, as the target object, the first player object satisfying a setting condition defined based on the first parameter value.

4. A game system according to claim 3,
wherein the target-object setting unit sets, as the target object, the first player object satisfying the setting condition defined based on a relative positional relationship with respect to a position of the non-player object.

5. A game system according to claim 3,
wherein the target-object setting unit,
upon determining, while the first player object of the plurality of player objects is set as the target object, that the first player object no longer satisfies the setting condition and that a second player object of the plurality of player objects comes to satisfy the setting condition,
discharges the first player object from the target object, and
sets the second player object as the target object, and
wherein the notification unit issues a notification for permitting action control for the non-player object to the client terminal that controls an action of the second player object.

6. A game system according to claim 1,
wherein the predetermined action is an attack by the non-player object on the first player object.

7. A game system according to claim 1,
wherein the plurality of action contents comprise a movement direction of the non-player object, a movement distance of the non-player object, and a selected attacking skill.

8. A game system comprising a server and a client terminal,
wherein the server comprises:
a first non-player character (NPC) action control unit that controls a non-player object and sends first NPC action information indicating first action content of the non-player object to the client terminal;
a management unit that manages a first parameter value in association with the non-player object and a plurality of player objects;
a target-object setting unit that sets a target object based on the first parameter value, the target object being a player object among the plurality of player objects on which the non-player object performs a predetermined action comprising a plurality of action contents for a battle scene; and
a notification unit that issues a notification for permitting action control for the non-player object to the client terminal that controls the player object set as the target object, and
wherein the client terminal comprises:
a second NPC action control unit that controls second action content of the non-player object for the predetermined action based on receiving the notification from the server,
wherein the plurality of action contents comprise the first action content and the second action content, and
wherein the non-player object is controlled by the server and the client terminal during the predetermined action based on the first action content and the second action content,
wherein the management unit manages state information indicating whether or not the client terminal is in a state permitted to perform action control for the non-player object,
wherein the first NPC action control unit controls the non-player object based on the state information, and
wherein, when communication between the client terminal permitted to perform action control for the non-player object and the server becomes disconnected in the state in which the client terminal is permitted to perform action control for the non-player object, the management unit changes the state information to a state in which the client terminal is not permitted to perform action control for the non-player object.

9. A control method for a game system including a server and a client terminal,
wherein the server executes:
a first non-player character (NPC) action control step of controlling a non-player object and sending first NPC action information indicating first action content of the non-player object to the client terminal;
a parameter-value management step of managing a first parameter value in association with the non-player object and a plurality of player objects;
a target-object setting step of setting a target object based on the first parameter value, the target object being a player object among the plurality of player objects on which the non-player object performs a predetermined action comprising a plurality of action contents for a battle scene; and
a notification step of issuing a notification for permitting action control for the non-player object to the client terminal that controls the player object set as the target object, and wherein the client terminal executes:
a second NPC action control step of controlling second action content of the non-player object for the predetermined action based on receiving the notification from the server,
wherein the plurality of action contents comprise the first action content and the second action content, and
wherein the non-player object is controlled by the server and the client terminal during the predetermined action based on the first action content and the second action content,
wherein the server manages state information indicating whether or not the client terminal is in a state permitted to perform action control for the non-player object,
wherein the client terminal controls the non-player object based on the state information, and
wherein, when a second parameter value of the player object set as the target object satisfies a numerical condition in the state in which the client terminal is permitted to perform action control for the non-player object, the server changes the state information to a state in which the client terminal is not permitted to perform action control for the non-player object.

10. A server in a game system including the server and a client terminal,
the server comprising:
a first non-player character (NPC) action control unit that controls a non-player object and sends first NPC action information indicating first action content of the non-player object to the client terminal;
a management unit that manages a first parameter value in association with the non-player object and a plurality of player objects;
a target-object setting unit that sets a target object based on the first parameter value, the target object being a first player object among the plurality of player objects on which the non-player object performs a predetermined action comprising a plurality of action contents for a battle scene; and
a notification unit that issues a notification for permitting action control for the non-player object to the client terminal that controls the first player object set as the target object,
wherein second action content of the non-player object for the predetermined action is controlled based on receiving the notification from the server,
wherein the plurality of action contents comprise the first action content and the second action content, and
wherein the non-player object is controlled by the server and the client terminal during the predetermined action based on the first action content and the second action content,
wherein the management unit manages state information indicating whether or not the client terminal is in a state permitted to perform action control for the non-player object,
wherein the first NPC action control unit controls the non-player object based on the state information, and
wherein, when a second parameter value of the first player object set as the target object satisfies a numerical condition in the state in which the client terminal is permitted to perform action control for the non-player object, the management unit changes the state information to a state in which the client terminal is not permitted to perform action control for the non-player object.

11. A server according to claim 10, further comprising:
a relay unit that receives second NPC action information indicating the first action content of the non-player object from the server that controls the non-player object based on the notification and sends the second NPC action information to another client terminal.

12. A server according to claim 10,
wherein the management unit changes the first parameter value based on action content of the first player object, and
wherein the target-object setting unit sets, as the target object, the first player object satisfying a setting condition defined based on the first parameter value.

13. A server according to claim 12,
wherein the target-object setting unit sets, as the target object, the first player object satisfying the setting condition defined based on a relative positional relationship with respect to a position of the non-player object.

14. A server according to claim 12,
wherein the target-object setting unit sets, as the target object, the first player object satisfying the setting condition defined based on a relative positional relationship with respect to a position of the non-player object,
wherein the target-object setting unit, upon determining, while the first player object of the plurality of player objects is set as the target object, that the first player object no longer satisfies the setting condition and that a second player object of the plurality of player objects comes to satisfy the setting condition,
discharges the first player object from the target object, and
sets the second player object as the target object, and
wherein the notification unit issues a notification for not permitting action control for the non-player object to the client terminal that controls the first player object, and
issues a notification for permitting action control for the non-player object to the client terminal that controls the second player object.

15. A server in a game system including the server and a client terminal, the server comprising:
a first non-player character (NPC) action control unit that controls a non-player object and sends first NPC action information indicating first action content of the non-player object to the client terminal;
a management unit that manages a first parameter value in association with the non-player object and a plurality of player objects;
a target-object setting unit that sets a target object based on the first parameter value, the target object being a player object among the plurality of player objects on which the non-player object performs a predetermined action comprising a plurality of action contents for a battle scene; and
a notification unit that issues a notification for permitting action control for the non-player object to the client terminal that controls the player object set as the target object,
wherein second action content of the non-player object for the predetermined action is controlled based on receiving the notification from the server,
wherein the plurality of action contents comprise the first action content and the second action content, and
wherein the non-player object is controlled by the server and the client terminal during the predetermined action based on the first action content and the second action content,
wherein the management unit manages state information indicating whether or not the client terminal is in a state permitted to perform action control for the non-player object,
wherein the first NPC action control unit controls the non-player object based on the state information, and
wherein, when communication between the client terminal permitted to perform action control for the non-player object and the server becomes disconnected in the state in which the client terminal is permitted to perform action control for the non-player object, the management unit changes the state information to a state in which the client terminal is not permitted to perform action control for the non-player object.

16. A program in a non-transitory storage medium for causing a server in a game system including the server and a client terminal to function as:
a first non-player character (NPC) action control means for controlling a non-player object and sending first NPC action information indicating first action content of the non-player object to the client terminal;
a parameter-value management means for managing a first parameter value in association with the non-player object and a plurality of player objects;
a target-object setting means for setting a target object based on the first parameter value, the target object being a player object among the plurality of player objects on which the non-player object performs a predetermined action comprising a plurality of action contents for a battle scene; and
a notification means for issuing a notification for permitting action control for the non-player object to the client terminal that controls the player object set as the target object,
wherein second action content of the non-player object for the predetermined action is controlled based on receiving the notification from the server,
wherein the plurality of action contents comprise the first action content and the second action content, and
wherein the non-player object is controlled by the server and the client terminal during the predetermined action based on the first action content and the second action content,
wherein the server indicating whether or not the client terminal is in a state permitted to perform action control for the non-player object,
wherein the client terminal controls the non-player object based on the state information, and
wherein, when a second parameter value of the player object set as the target object satisfies a numerical condition in the state in which the client terminal is permitted to perform action control for the non-player object, the server changes the state information to a state in which the client terminal is not permitted to perform action control for the non-player object.

* * * * *